(12) United States Patent
Wishneusky

(10) Patent No.: US 8,239,597 B2
(45) Date of Patent: Aug. 7, 2012

(54) DEVICE-TO-DEVICE COMMUNICATION BUS FOR DISTRIBUTED POWER MANAGEMENT

(75) Inventor: John A. Wishneusky, Austin, TX (US)

(73) Assignee: Intersil Americas Inc., Milpitas, CA (US)

( * ) Notice: Subject to any disclaimer, the term of this patent is extended or adjusted under 35 U.S.C. 154(b) by 508 days.

(21) Appl. No.: 12/505,218

(22) Filed: Jul. 17, 2009

(65) Prior Publication Data

US 2010/0017654 A1    Jan. 21, 2010

Related U.S. Application Data

(60) Provisional application No. 61/082,025, filed on Jul. 18, 2008.

(51) Int. Cl.
G06F 13/368 (2006.01)
G06F 13/00 (2006.01)
(52) U.S. Cl. .................. 710/119; 710/107; 710/108
(58) Field of Classification Search ............. 710/3–4, 710/15, 17–19, 107–110, 119, 121, 123, 710/125
See application file for complete search history.

(56) References Cited

U.S. PATENT DOCUMENTS

| | | | |
|---|---|---|---|
| 5,117,430 A | 5/1992 | Berglund | |
| 5,646,509 A | 7/1997 | Berglund et al. | |
| 5,675,480 A | 10/1997 | Stanford | |
| 5,935,252 A | 8/1999 | Berglund et al. | |
| 6,003,139 A | 12/1999 | McKenzie | |
| 6,079,026 A | 6/2000 | Berglund et al. | |
| 6,181,708 B1 * | 1/2001 | Quackenbush et al. | ....... 370/445 |
| 6,199,130 B1 | 3/2001 | Berglund et al. | |
| 6,262,900 B1 | 7/2001 | Suntio | |

(Continued)

FOREIGN PATENT DOCUMENTS

WO    02/31943 A2    4/2002

OTHER PUBLICATIONS

Boterenbrood, H. "CANopen high-level protocol for CAN-bus". Version 3.0. Mar. 20, 2000. NIKHEF. Amsterdam. pp. 1-23.*

(Continued)

*Primary Examiner* — Thomas J Cleary
(74) *Attorney, Agent, or Firm* — Meyertons Hood Kivlin Kowert & Goetzel, P.C.; Jeffrey C. Hood

(57) ABSTRACT

A Device-to-Device Communication Bus protocol may facilitate transmission of a two to four byte packet by any device sharing the bus. All devices on the bus may monitor the bus, receiving all packets transmitted by other devices and recognizing when they may initiate transmission. The first byte of the packet may be an Address byte uniquely identifying the sender and allowing hardware arbitration to uniquely select one of any number of senders who may wish to transmit and begin transmission simultaneously. Arbitration may take place during transmission of the Address byte, with the transmitting device monitoring a bus bit value as it is transmitting the Address byte. If the data value observed by the transmitting device doesn't match the transmitting device's desired transmit value, the transmitting device may recognize loss of arbitration and suspend transmission to retry once the packet is complete. The receive function in every device may accept the packet as a normal received packet. The arbitration scheme may also include a fairness mechanism to insure one or several devices cannot monopolize the bus.

32 Claims, 18 Drawing Sheets

U.S. PATENT DOCUMENTS

| | | | |
|---|---|---|---|
| 6,396,167 | B1 | 5/2002 | Simburger et al. |
| 6,396,169 | B1 | 5/2002 | Voegeli et al. |
| 6,421,259 | B1 | 7/2002 | Brooks et al. |
| 6,470,382 | B1 | 10/2002 | Wang et al. |
| 6,563,294 | B2 | 5/2003 | Duffy et al. |
| 6,709,277 | B2 | 3/2004 | Ruttan et al. |
| 6,754,720 | B1 | 6/2004 | Packer |
| 6,788,035 | B2 | 9/2004 | Bassett et al. |
| 6,894,468 | B1 | 5/2005 | Bretz et al. |
| 6,915,440 | B2 | 7/2005 | Berglund et al. |
| 6,930,893 | B2 | 8/2005 | Vinciarelli |
| 6,936,999 | B2 | 8/2005 | Chapuis |
| 6,944,686 | B2 | 9/2005 | Naruse et al. |
| 6,949,916 | B2 | 9/2005 | Chapuis |
| 6,965,502 | B2 | 11/2005 | Duffy et al. |
| 7,000,125 | B2 | 2/2006 | Chapuis et al. |
| 7,049,798 | B2 | 5/2006 | Chapuis et al. |
| 7,080,265 | B2 | 7/2006 | Thaker et al. |
| 7,082,485 | B2 | 7/2006 | Ellerbrock et al. |
| 7,082,488 | B2 | 7/2006 | Larson et al. |
| 7,103,697 | B2 | 9/2006 | Scordalakes |
| 7,174,402 | B2 | 2/2007 | Ellerbrock et al. |
| 7,177,970 | B2 | 2/2007 | Kondo et al. |
| 7,206,944 | B2 | 4/2007 | Odaohhara et al. |
| 7,373,527 | B2 | 5/2008 | Chapuis |
| 7,653,757 | B1 * | 1/2010 | Fernald et al. ............... 710/3 |
| 7,685,320 | B1 * | 3/2010 | Wishneusky ............... 710/3 |
| 7,793,005 | B1 * | 9/2010 | Fernald et al. ............... 710/3 |
| 2001/0007118 | A1 | 7/2001 | Matsuda |
| 2001/0052762 | A1 | 12/2001 | Tsuji |
| 2003/0070020 | A1 | 4/2003 | Kondo et al. |
| 2003/0084216 | A1 * | 5/2003 | White et al. ............... 710/104 |
| 2003/0142513 | A1 | 7/2003 | Vinciarelli |
| 2003/0191862 | A1 | 10/2003 | Greenblat |
| 2004/0093533 | A1 | 5/2004 | Chapuis et al. |
| 2004/0120356 | A1 * | 6/2004 | Davenport et al. ........... 370/516 |
| 2004/0123164 | A1 | 6/2004 | Chapuis et al. |
| 2004/0123167 | A1 | 6/2004 | Chapuis |
| 2004/0135560 | A1 | 7/2004 | Kernahan et al. |
| 2004/0201279 | A1 | 10/2004 | Templeton |
| 2004/0255070 | A1 | 12/2004 | Larson et al. |
| 2006/0172783 | A1 | 8/2006 | Leung et al. |
| 2006/0172787 | A1 | 8/2006 | Ellis et al. |
| 2007/0067518 | A1 * | 3/2007 | Nichols ................... 710/100 |
| 2008/0107029 | A1 * | 5/2008 | Hall et al. ............... 370/235 |
| 2009/0157929 | A1 * | 6/2009 | Pigott et al. ............... 710/110 |
| 2010/0020784 | A1 * | 1/2010 | Goldfisher et al. ........... 370/347 |

OTHER PUBLICATIONS

Corrigan, Steve. Introduction to the Controller Area Network (CAN). Application Report SLOA101. Texas Instruments, Inc. Aug. 2002. pp. 1-17.*

V. C. H. Nicholas, C. T. Lau, and B. S. Lee; "A Power LAN for Telecommunication Power Supply Equipment"; IEEE Conference on Computer, Communication, Control and Power Engineering (TENCON, Region 10); Oct. 1993; pp. 24-27; vol. 3; Beijing.

Jerry G. Williford and James T. Dubose; "30 kVA LF/VLF Power Amplifier Module"; IEEE Military Communications Conference (MILCOM '95); Nov. 1995; pp. 748-751, vol. 2.

R. Sebastian, M. Castro, E. Sancristobal, F. Yeves, J. Peire, and J. Quesada; "Approaching hybrid wind-diesel systems and Controller Area Network"; IEEE 28th Annual Conference of the Industrial Electronics Society; Nov. 2002; pp. 2300-2305, vol. 3.

James P. Earle; "IPMI/IPMB Satellite Controller for Power Supply Applications" (Preliminary Specification);C&D Technologies, Inc.; <http://www.cd4power.com/data/apnotes/acan-02.pdf>; 92 pages.

James P. Earle; "IPMI/IMPB Satellite Controller Test Procedure" (Application Guide); C&D Technologies, Inc.; <www.cdpowerelectronics.net/products/appnotes/acan04.pdf>; 12 pages.

"How to Design Battery Charger Applications that Require External Microcontrollers and Related System-Level Issues"; Dallas Semiconductor; <www.maxim-ic.com/appnotes.cfm/appnote_number/680>; Mar. 15, 2000.; 20 pages.

"APC-3000-R Front End AC-DC Power Shelf"; Advanced Power Conversion PLC (Data Sheet); Nov. 2002; 6 pages.

"Providing a DSP Power Solution from 5-V or 3.3-V Only System"; Texas Instruments; <http://focus.ti.com/lit/an/slva069/slva069.pdf>; May 1999; 12 pages.

"HDX-600P Hot Swap—600 Watts—1U High"; Switching Power, Inc.; www.switchpwr.com/hdx-600p.pdf; 2 pages.

"HDSX-600P: I2C Serial Bus Interface (for IPMI implementation):"; Switching Power, Inc.; <www.switchpwr.com/I2C>.pdf; 3 pages.

John M. Hawkins; "Characteristics of automated power system monitoring and management platforms"; Twenty-second International Telecommunications Energy Conference (INTELEC); Sep. 2000; pp. 46-50.

A. Jossen, V. Spath, H. Doring & J. Garche; "Battery Management Systems (BMS) for Increasing Battery Life Time"; The Third International Conference on Telecommunications Energy Special, (TELESCON); May 2000; pp. 81-88; Dresden, Germany.

Tom Lock; "Digitally Controlled Power Systems: How Much Intelligence Is Needed and Where It Should Be"; Twentieth International Telecommunications Energy Conference (INTELEC); 1998; pp. 345-348.

"SPI—APPNOTES: Alarm & Monitoring Signals"; Switching Power Inc.; 2 pages; <www.switchpwr.com/alarm_signals>.pdf.

"TDA802OHL Dual Smart Card Interface—Objective Specification v4.2—Data Sheet"; Feb. 24, 2001; 22 pages; Philips Semiconductors.

Chrisotphe Chausset; "Application Note—TDA802OHL/C2 Dual Smart Card Interface"; May 20, 2003; 28 pages; Philips Semiconductors.

"Intelligent charge switches for charging circuit applications"; Jul. 2002; 2 pages; Philips Semiconductors; The Netherlands.

"PCF50604 Power Management Unit—2.5G/3G controller for power supply and battery management"; Jul. 2001; 4 pages; Philips Semiconductors; The Netherlands.

John Perzow; "Point-of-load regulation adds flexibility to set-top-box design"; Jun. 27, 2002; pp. 73-80; vol. 47, Part 14; <www.ednmag.com>.

H. Taylor and L.W. Hruska; "Standard Smart Batteries for Consumer Applications" Proceedings of the Tenth Annual Battery Conference on Applications and Advances; Jan. 1995; p. 183; Long Beach, CA, U.S.A.

"3-V to 6-V Input, 6-A Output Tracking Synchronous Buck PWM Switcher with Integrated FETs (SWIFT™) for Sequencing"; Oct. 2002-Apr. 2005; 21 pages; Texas Instruments Incorporated; <http://focus.ti.com/lit/ds/symlink/tps54680.pdf>.

"Programmable Four-Channel Step-Down DC/DC Converter"; Texas Instruments Incorporated; 2005; 16 pages; <http://focus.ti.com/lit/ds/symlink/tps54900.pdf>.

"LNBH21—LNB Supply and Control IC with Step-up Converter and I2C Interface" (Datasheet); Apr. 2004; 20 pages; STMicroelectronics; <www.st.com/stonline/products/literature/ds/9890.pdf>.

"Smart Battery System Specifications—System Management Bus Specification"; Dec. 11, 1998; 39 pages; SBS Implementers Forum.

"Advanced Configuration and Power Interface Specification"; Feb. 2, 1999; 397 pages; Intel Microsoft Toshiba.

"The I2C-Bus Specification—Version 2.1"; Jan. 2000; 46 pages; Philips Semiconductors.

"User's Guide Agilent Technologies Series 661xxA MPS Power Modules & Model 6001A MPS Keyboard"; Apr. 2000; 55 pages; Agilent Technologies; Malaysia.

Programming Guide Agilent Technologies Series 661xxA MPS Power Modules; Sep. 1997-Apr. 2000; 116 pages; Agilent Technologies.

M. Castro, R. Sebastian, F. Yeves, J. Peire, J. Urrutia and J. Quesada; "Well-Known Serial Buses for Distributed Control of Backup Power Plants. RS-485 versus Controller Area Network (CAN) Solutions"; IEEE 28th Annual Conference of the Industrial Electronics Society (IECON 02); Nov. 2002; pp. 2381-2386; vol. 3.

"Six-Channel Power Supply Supervisor and Cascade Sequence Controller" (Preliminary Information Data Sheet); Summit Microelectronics, Inc.; <www.summitmicro.com/prod_select/summary/sms66/SMS66DS.pdf>; 2003; 26 pages.

"Operating Manual for Internal RS-232 Interface for XT 60 Watt and HPC 300 Watt Series Programmable DC Power Supplies"; 2002; 62 pages; Xantrex Technology Inc.; Burnaby, B.C., Canada.

Paul Birman and Sarkis Nercessian; "Programmable supplies use switch-mode topologies"; Mar. 1995; pp. 33-34; Electronic Products Magazine; Garden City, New York, U.S.A.

A. Akiyama, T. Nakamura, M. Yoshida, T. Kubo, N. Yamamoto and T. Katoh; "KEKB Power Supply Interface Controller Module"; KEK, High Energy Accelerator Research Organization; 4 pages; Japan.

T. T. Nakaura, A. Akiyama, T. Katoh, Ta. Kubo, N. Yamamoto, and M. Yoshida; "Magnet Power Supply Control System in KEKB Accelerators"; International Conference on Accelerator and Large Experimental Physics Control Systems; 1999; pp. 406-408; Trieste, Italy.

"Installation Guide—Agilent Technologies MPS Mainframe Model 66000A"; Apr. 2000; 29 pages; Agilent Technologies; Malaysia.

"Chemistry-Independent Battery Chargers"; Maxim Integrated Products; <http://pdfserv.maxim-ic.com/en/ds/MAX1647-MAX1648.pdf>; 25 pages.; Sunnyvale, CA, U.S.A.

Ron Vinsant, John Difiore and Richard Clarke; "Digitally-controlled SMPS extends power system capabilities"; Powerconversion & Intelligent Motion; 1994; pp. 30-37; vol. 20, No. 6.

Office Action of Aug. 20, 2008, in U.S. Appl. No. 11/425,489, 37 pages.

Office Action of Aug. 19, 2008, in U.S. Appl. No. 11/435,629, 31 pages.

Office Action of Sep. 20, 2006, in U.S. Appl. No. 10/820,976, 19 pages.

Office Action of Feb. 21, 2007, in U.S. Appl. No. 10/820,976, 12 pages.

Final Office Action of Aug. 14, 2007, in U.S. Appl. No. 10/820,976, 12 pages.

Advisory Action of Oct. 26, 2007, in U.S. Appl. No. 10/820,976, 3 pages.

Examiner's Answer of Mar. 18, 2008, in U.S. Appl. No. 10/820,976, 18 pages.

Office Action of Jun. 17, 2008, in U.S. Appl. No. 10/820,976, 13 pages.

Office Action of Jun. 16, 2008, in U.S. Appl. No. 11/405,293, 20 pages.

Office Action of Nov. 8, 2006, in U.S. Appl. No. 11/198,698, 41 pages.

Final Office Action of May 3, 2007, in U.S. Appl. No. 11/198,698, 36 pages.

Interview Summary of May 31, 2007, in U.S. Appl. No. 11/198,698, 4 pages.

Office Action of Jul. 25, 2007, in U.S. Appl. No. 11/198,698, 32 pages.

Interview Summary of Oct. 31, 2007, in U.S. Appl. No. 11/198,698, 3 pages.

Final Office Action of Dec. 27, 2007, in U.S. Appl. No. 11/198,698, 30 pages.

Advisory Action of Feb. 19, 2008, in U.S. Appl. No. 11/198,698, 3 pages.

Interview Summary of Jul. 14, 2008, in U.S. Appl. No. 11/198,698, 2 pages.

Office Action of Nov. 13, 2006, in U.S. Appl. No. 11/405,294, 35 pages.

Final Office Action of May 8, 2007, in U.S. Appl. No. 11/405,294, 37 pages.

Office Action of Jul. 25, 2007, in U.S. Appl. No. 11/405,294, 35 pages.

Final Office Action of Dec. 27, 2007, in U.S. Appl. No. 11/405,294, 32 pages.

Advisory Action of Feb. 19, 2008, in U.S. Appl. No. 11/405,294, 3 pages.

Office Action of Oct. 9, 2007, in U.S. Appl. No. 11/425,489, 35 pages.

Final Office Action of Apr. 4, 2008, in U.S. Appl. No. 11/425,489, 29 pages.

"Calibrate," The Merriam-Webster Dictionary, copyright 2007-2008, Merriam-Webster, Inc., 11th Edition, 4 pages.

U.S. Appl. No. 11/435,629, entitled "Autonomous Sequencing and Fault Spreading", by John A. Wishneusky, filed May 17, 2006. 42 pages.

U.S. Appl. No. 11/425,489, entitled "Power Management System Using a Multi-Master Multi-Slave Bus and Multi-Function Point-of-Load Regulators", by Kenneth W. Fernald, James W. Templeton, and John A. Wishneusky, filed Jun. 21, 2006. 48 pages.

U.S. Appl. No. 11/405,294, entitled "Method for Using a Multi-Master Multi-Slave BUS for Power Management", by Kenneth W. Fernald, James W. Templeton, and John A. Wishneusky, filed Apr. 17, 2006. 40 pages.

U.S. Appl. No. 11/198,698, entitled "Method for Using a Multi-Master Multi-Slave BUS for Power Management", by Kenneth W. Fernald, James W. Templeton, and John A. Wishneusky, filed Aug. 5, 2005. 36 pages.

U.S. Appl. No. 11/405,293, entitled "Plug-and-Play Point of Load Regulator", by James W. Templeton, filed Apr. 17, 2006. 35 pages.

U.S. Appl. No. 11/356,674, entitled "Point of Load Regulator Having a Pinstrapped Configuration and Which Performs Intelligent Bus Monitoring", by James W. Templeton, filed Feb. 17, 2006. 41 pages.

U.S. Appl. No. 10/820,976, entitled "Method and Apparatus for Improved DC Power Delivery, Management and Configuration", by James W. Templeton, filed Apr. 8, 2004. 37 pages.

* cited by examiner

Communication between POL regulators takes place over DDC Bus 130

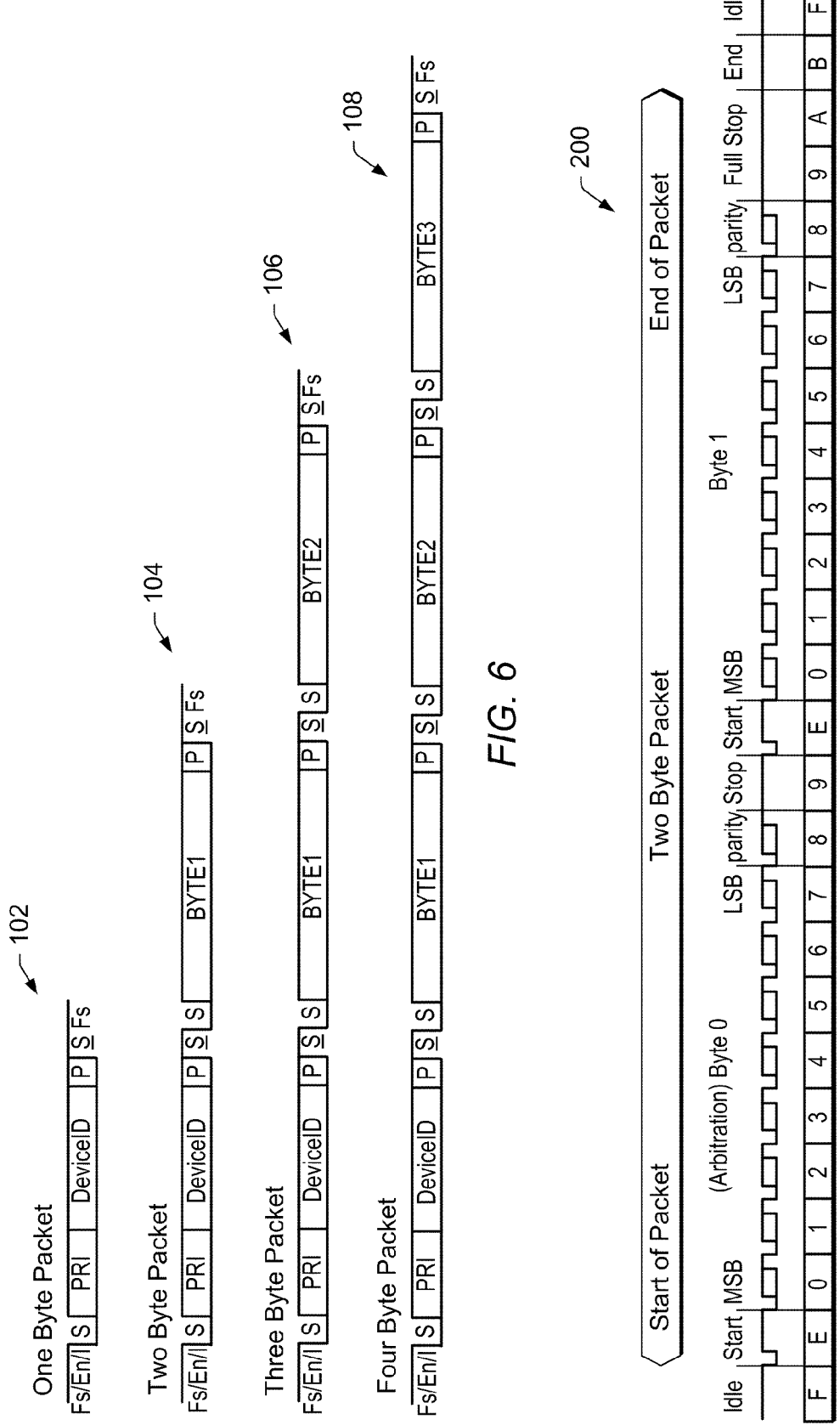

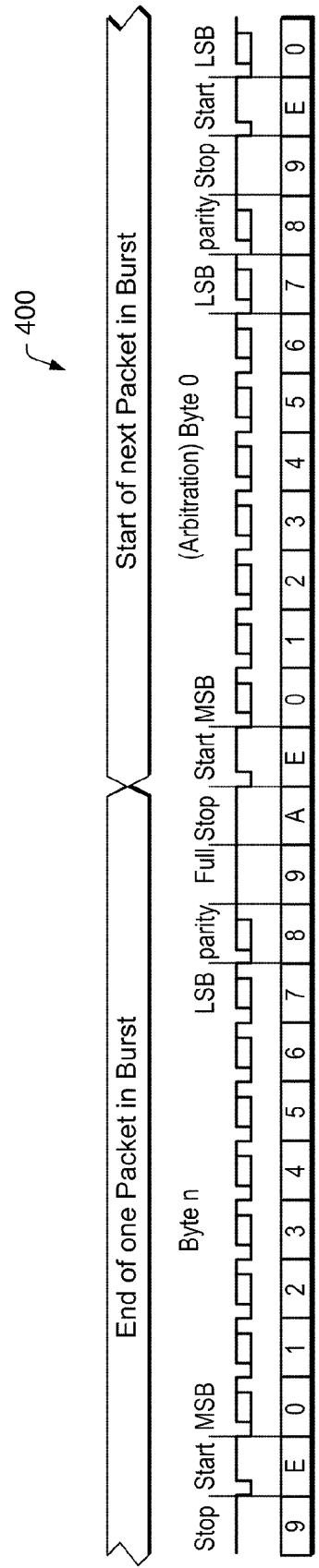

1600

| Field | Name | Type | Value | Function |
|---|---|---|---|---|
| 7 | SEND | R/W | 0 | |
| | | | 1 | Send the packed with length given by TXBYTES. Automatically set by any write to DDCTXCN if the DDC controller is enabled. |
| 6 | res | | 0 | |
| | | | 1 | |
| 5 | res | | 0 | |
| | | | 1 | |
| 4 | res | | 0 | |
| | | | 1 | |
| 3 | res | | 0 | |
| | | | 1 | |
| 2 | res | | 0 | |
| | | | 1 | |
| 1:0 | TXBYTES | R/W | 00 | Send a 1 byte packet: DDCTXADDR |
| | | | 01 | Send a 2 byte packet: DDCTXADDR, DDCTXBYTE1 |
| | | | 10 | Send a 3 byte packet: DDCTXADDR, DDCTXBYTE1, DDCTXBYTE2 |
| | | | 11 | Send a 4 byte packet: DDCTXADDR, DDCTXBYTE1, DDCTXBYTE2, DDCTXBYTE3 |

FIG. 21

| Field | Name | Type | Value | Function |
|---|---|---|---|---|
| 7 | TXDONE | R | 0 | |
| | | | 1 | The requested packet has been transmitted without error and the SEND bit in DDCTXCN has been cleared. |
| 6 | TXERR | R | 0 | |
| | | | 1 | A TXPARITY or TXABORT error occurred when transmitting a packet. |
| 5 | TXPARITY | R | 0 | |
| | | | 1 | A parity error was detected on our transmission. |
| 4 | res | | 0 | |
| | | | 1 | |
| 3 | res | R/W | 0 | |
| | | | 1 | |
| 2 | TXABORT | R/W | 0 | Our packet transmission was aborted by another device. |
| | | | 1 | |
| 1 | res | R/W | 0 | |
| 0 | res | R/W | 0 | |

FIG. 22

| Field | Name | Type | Value | Function |
|---|---|---|---|---|
| 7 | RXDONE | R | 0 | |
| | | | 1 | A packet has been received without error. |
| 6 | RXERR | R | 0 | Make no response to the ARA address. |
| | | | 1 | The OR of RXPARITY, RXFE and RXOE and a cause for a receive interrupt. |
| 5 | RXPARITY | R | 0 | |
| | | | 1 | A parity error was detected on a byte in the packet. ABORT was generated unless IGNPARITY is set. |
| 4 | RXFE | R | 0 | |
| | | | 1 | A framing error was detected during the packet because a STOP symbol occurred when a data or parity bit was expected. |
| 3 | RXOE | R | 0 | |
| | | | 1 | An overrun error has occurred. This bit is set at the end of the next DDCRXADDR byte if firmware has not cleared RXDONE |
| 2 | RXEVENT | R | 0 | A DDC RX EVENT was detected because the Address byte |
| | | | 1 | was an exact match for the DDCEVENT register. This bit is set if parity is correct for an exact match of the Address byte without regard to the actual length of the packet or the correct reception of the full packet. It is not a cause of a DDC RX interrupt. If firmware wishes the event to be generated on a packet it transmits, it must set LOOPEN and also receive the packet. |
| 1:0 | RXBYTES | R | 00 | Received a 1 byte packet: DDCRXADDR |
| | | | 01 | Received a 2 byte packet: DDCRXADDR, DDCRXBYTE1 |
| | | | 10 | Received a 3 byte packet: DDCRXADDR, DDCRXBYTE1, DDCRXBYTE2 |
| | | | 11 | Received a 4 byte packet: DDCRXADDR, DDCRXBYTE1, DDCRXBYTE2, DDCRXBYTE3 |

FIG. 23

| Field | Name | Type | Value | Function |
|---|---|---|---|---|
| 7 | UNFAIR | R/W | 0 | Act in a FAIR manner – within a burst of packets, do not transmit a second packet once a packet has been sent until the current burst is ended, signaled when a packet is followed by 3 or more Stop bits. |
| | | | 1 | Act in an unfair manner as a transmitter and attempt transmission of a packet within a burst whenever SEND is set. |
| 6 | STOPONERR | R/W | 0 | Continue to retry transmission of a packet in the presence of parity and abort errors. |
| | | | 1 | When transmitting a packet do not attempt a retry if a parity error or a packet abort is detected. SEND is not cleared and retransmission is automatic when DDCTXSTSAT is cleared by firmware. |
| 5 | IGNPARITY | R/W | 0 | Force an ABORT of a received packet when a parity error is detected. |
| | | | 1 | If a receive parity error is detected do NOT force an ABORT of the packet. Do report the parity error status in DDCRXSTAT. |
| 4 | LOOPEN | R/W | 0 | Do not receive packets we transmit. |
| | | | 1 | Loopback enable: receive all packets transmitted. |
| 3.0 | QUARTER PERIOD | R/W | 0x0 | Disable the DDC Controller, packet transmission and reception is completely disabled. |
| | | | 0x6: 0xf | Sets the quarter period count value in units of the 8 MHz MCU clock. Values less than 0x6 are not recommended. |

*FIG. 24*

| Quarter Period | Period in mcu clocks | Baud-rate |
|---|---|---|
| 0xF | 60 | 133 |
| 0xE | 56 | 142 |
| 0xD | 52 | 153 |
| 0xC | 48 | 166 |
| 0xB | 44 | 181 |
| 0xA | 40 | 200 |
| 0x9 | 36 | 222 |
| 0x8 | 32 | 250 |
| 0x7 | 28 | 286 |
| 0x6 | 24 | 333 |
| 0 | DDC Disabled | NA |

FIG. 25

| Field | Name | Type | Value | Function |
|---|---|---|---|---|
| 7:4 | TIMER PRELOAD | R/W | 0x5 | The falling edge synchronization offset. Whether transmitting or receiving, the DDC Bus controller sets its bit timing counter to this value on recognizing a falling edge on the bus. |
| 3:00 | SAMPLE DELAY | R/W | 0x7 | The Sample_Delay chooses the counter value within the 3rd quarter period of bit timing. It is used to account for rise time and synchronization clocking delays which retard the actual rise times of 1 and 0 values on the bus from the ideal ¼ period points within the bit time. |

FIG. 26

| Field | Name | Type | Value | Function |
|---|---|---|---|---|
| 7:0 | DDCEVENT | R/W | 0 | The value in this register is compared to every received DDCRXADDR byte having correct parity. An exact match sets the RXEVENT status bit in DDCRXSTAT. If the signal trig_en is true, it also asserts the ddc_trig and ddc_trig_n signals. The status bits and ddc_trig signals remain set/asserted until firmware clears the RXEVENT status by writing to DDCRXSTAT |

FIG. 27

| Field | Name | Type | Value | Meaning |
|---|---|---|---|---|
| 7:6 | TX_MAIN state | R | 0 | The state of the Tx Main state machine. |
| 5:4 | RX_MAIN state | R | 0 | The state of the Rx Main state machine |
| 3:0 | BIT_COUNTER | R | 0xF | The state of the DDC Bus. |

FIG. 28

| Tx Main State value | State |
|---|---|
| 0x0 | Tx Idle |
| 0x1 | Tx Pending |
| 0x2 | Tx Data |
| 0x3 | Tx GenFullStop |

FIG. 29

| Rx Main State value | State |
|---|---|
| 0x0 | Rx Idle |
| 0x1 | Rx Data |
| 0x2 | Rx FullStop |
| 0x3 | Rx Abort |

FIG. 30

| Bit Counter State value | State |
|---|---|
| 0x0 | Bit 1 |
| 0x1 | Bit 2 |
| 0x2 | Bit 3 |
| 0x3 | Bit 4 |
| 0x4 | Bit 5 |
| 0x5 | Bit 6 |
| 0x6 | Bit 7 |
| 0x7 | Bit 8 |
| 0x8 | Parity Bit |
| 0x9 | Stop |
| 0xA | FullStop |
| 0xB | End |
| 0xC | Abort |
| 0xD | Not Used |
| 0xE | Start |
| 0xF | Bus Idle |

FIG. 31

| Field | Name | Type | Value | Function |
|---|---|---|---|---|
| 7:0 | DDCTXADDR | R/W | 0 | The Address byte which will be transmitted in the next packet transmission TXBYTES = 0, 1, 2 or 3, initiated by firmware. |

*FIG. 32*

| Field | Name | Type | Value | Function |
|---|---|---|---|---|
| 7:0 | DDCTXBYTE1 | R/W | 0 | The first data byte which will be transmitted in the next packet transmission TXBYTES = 1, 2 or 3, initiated by firmware. |

*FIG. 33*

| Field | Name | Type | Value | Function |
|---|---|---|---|---|
| 7:0 | DDCTXBYTE2 | R/W | 0 | The first data byte which will be transmitted in the next packet transmission with TXBYTES = 2 or 3, initiated by firmware |

*FIG. 34*

| Field | Name | Type | Value | Function |
|---|---|---|---|---|
| 7:0 | DDCTXBYTE3 | R/W | 0 | The third data byte which will be transmitted in the next packet transmission with TXBYTES = 3, initiated by firmware. |

*FIG. 35*

| Field | Name | Type | Value | Function |
|---|---|---|---|---|
| 7:0 | DDCRXADDR | R/W | 0 | The most recent Address byte received on the DDC Bus. |

*FIG. 36*

| Field | Name | Type | Value | Function |
|---|---|---|---|---|
| 7:0 | DDCRXBYTE1 | R/W | 0 | The most recent first data byte received on the DDC Bus. |

*FIG. 37*

| Field | Name | Type | Value | Function |
|---|---|---|---|---|
| 7:0 | DDCRXBYTE2 | R/W | 0 | The most recent second data byte received on the DDC Bus. |

*FIG. 38*

| Field | Name | Type | Value | Function |
|---|---|---|---|---|
| 7:0 | DDCRXBYTE3 | R/W | 0 | The most recent third data byte received on the DDC Bus. |

*FIG. 39*

DEVICE-TO-DEVICE COMMUNICATION BUS FOR DISTRIBUTED POWER MANAGEMENT

PRIORITY CLAIM

This application claims benefit of priority of provisional application Ser. No. 61/082,025 titled "Device-To-Device Communication Bus and Active Droop Current Sharing for Distributed Power Management", whose inventors are John A. Wishneusky, Douglas E. Heineman, Kenneth W. Fernald, and Nicholas J. Havens, and which was filed Jul. 18, 2008, and is hereby incorporated by reference as though fully and completely set forth herein.

BRIEF DESCRIPTION OF THE DRAWINGS

The foregoing, as well as other objects, features, and advantages of this invention may be more completely understood by reference to the following detailed description when read together with the accompanying drawings in which:

FIG. 6 shows some examples of possible DDC packet types;

FIG. 7 shows one example of a more detailed diagram of one embodiment of a two-byte DDC packet;

FIG. 8 shows possible states of a bit-counter state machine that may be configured within a DDC Bus controller;

FIG. 9 shows one example of packets within a burst transmission on a DDC Bus;

FIG. 21 shows a table illustrating the structure of the DDC Transmit Control register according to one embodiment FIG. 22 shows a table illustrating the structure of the DDC Transmit Status register according to one embodiment;

FIG. 23 shows a table illustrating the structure of the DDC Receive Status register according to one embodiment;

FIG. 24 shows a table illustrating the structure of a first DDC Configuration register according to one embodiment;

FIG. 25 shows a table with possible baud rate settings for the DDC Bus according to one embodiment;

FIG. 26 shows a table illustrating the structure of a second DDC Configuration register according to one embodiment;

FIG. 27 shows a table illustrating the structure of the DDCEVENT register according to one embodiment;

FIG. 28 shows a table illustrating the structure of the DDC Status register according to one embodiment;

FIG. 29 shows a table with possible values for the TX (Transmit) Main State field of the DDC Status register according to one embodiment;

FIG. 30 shows a table with possible values for the RX (Receive) Main State field of the DDC Status register according to one embodiment;

FIG. 31 shows a table with possible values for the Bit Counter field of the DDC Status register according to one embodiment;

FIG. 32 shows a table illustrating the structure of the DDC Transmit Address register according to one embodiment;

FIG. 33 shows a table illustrating the structure of a first DDC Transmit Byte register according to one embodiment;

FIG. 34 shows a table illustrating the structure of a second DDC Transmit Byte register according to one embodiment;

FIG. 35 shows a table illustrating the structure of a third DDC Transmit Byte register according to one embodiment;

FIG. 36 shows a table illustrating the structure of the DDC Receive Address register according to one embodiment;

FIG. 37 shows a table illustrating the structure of a first DDC Receive Byte register according to one embodiment;

FIG. 38 shows a table illustrating the structure of a second DDC Receive Byte register according to one embodiment; and FIG. 39 shows a table illustrating the structure of a third DDC Receive Byte register according to one embodiment.

Figure 1:
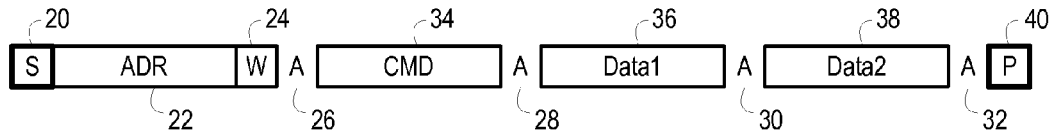
FIG. 1 shows the basic packet structure of an I2C packet.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, a device coupled to a bus that is "uniquely identified by an address" refers to a device identified by an address that is not shared with any other device that is also coupled to the bus. That is, the address that identifies a specified device does not identify any other device. However, more than one address may uniquely identify a single device. For example, a device may be uniquely identified by address '34ef45' and also by address '34ef44', but neither '34ef45' nor '34ef44' may identify any other device. Furthermore, "targeting an address" during a bus operation refers to initiating the bus operation addressing a device uniquely identified by the address. For example, if a first device coupled to the bus has a specified first address that uniquely identifies the first device, and a second device initiates a write operation "targeting the specified first address", then the address information transmitted by the first device as part of initiating the write operation is the specified first address. In other words, when initiating the bus operation, the first device need not transmit a general broadcast address or a special address, only one of the addresses that uniquely identifies the first device. The first device will thereby be addressing itself when initiating the bus operation, and will not be addressing another device (i.e. it will not initiate the bus operation by sending the address of a different target device as the target address of the bus operation).

Distributed Power Management

Power distribution in complex systems is often accomplished by distributing a high-voltage, low-current power source to a set of local direct-current to direct-current (DC-to-DC) converters. These converters, typically known as point-of-load (POL) devices, convert the higher voltage to a level more appropriate for the load or multiple loads that require power. Generally, each POL may be configured to generate a different voltage potential or multiple POLs may be configured to generate the same voltage potential. POLs generating the same voltage potential may be designed to drive separate loads. Similarly, two or more POLs may be connected in parallel to drive one or more common loads.

In systems that utilize multiple POL devices, it is common for the POL devices to exchange information in order to implement necessary power management features. Typical power management features may include voltage tracking, load balancing, sequencing, phase spreading, and clock synchronization. With the rising complexity and robustness requirements of many systems, the ability to monitor and control the power distribution sub-system has become increasingly more critical. Traditionally, information exchanged by POL devices has been represented by analog voltage and/or current signals. There are, however, several advantages to representing the exchanged information as digital data that may be transferred across a bus interconnecting all related POL devices. Monitoring of power distribution sub-systems has typically been implemented via a standard digital interface coupling the major components of the power distribution system to a host microprocessor (oftentimes identified as a Local Controller). The digital interface may allow the Local Controller to continuously monitor the health of the power system. It may also control the power system in order to implement system-level features such as standby and sleep modes.

One digital interface that is particularly well suited for such applications is the I2C (Inter-IC) bus. The I2C bus is a multi-master, multi-slave, two-wire bus that offers support for any device on the bus to access any other device. Transactions on the I2C bus typically consist of a start event, a destination slave address, a read/write bit, and a variable number of data bytes. The transactions are generally terminated by a stop event or another start event. The data byte immediately following the destination slave address may be interpreted as a command or tag byte, which identifies the nature and/or type of the packet.

FIG. 1 shows the basic packet structure of an I2C packet 100, which may contain data to be transferred or written to a slave device. Packet 100 may include a start bit "S" 20 signaling the beginning of the communication from the master. This may be followed by a unique slave address byte "ADR" 22, with the most significant bit (MSB) coming first. The subsequent Read/Write bit 24, typically the eighth bit after "S" 22, specifies whether the slave is to receive (typically a '0' value) or to transmit (typically a '1' value). The Read/Write bit 24 may be followed by an acknowledge bit "A" 26 issued by the receiver, acknowledging receipt of the previous byte. Then the transmitter (slave or master, as indicated by the Read/Write bit) may transmit a data byte 34 starting with the MSB. In the example packet of FIG. 1, the slave is to receive and the first byte following the slave address byte 22 is a command byte "CMD" 34 sent by the master. At the end of the byte, the receiver may issue a new "A" 28. This 9-bit pattern may be repeated until all the required bytes have been transmitted, in this case Data1 36 and Data2 38, and acknowledge bit following each byte. In a write transaction, as illustrated in FIG. 1, when the master is done transmitting, it may monitor the last acknowledge bit, that is, "A" 32, then issue a stop condition "P" 40. In a read transaction (slave transmitting), the master may not acknowledge final byte 38, thereby indicating to the slave that the slave's transmission is completed. The master may then issue "P" 40.

Figure 2:
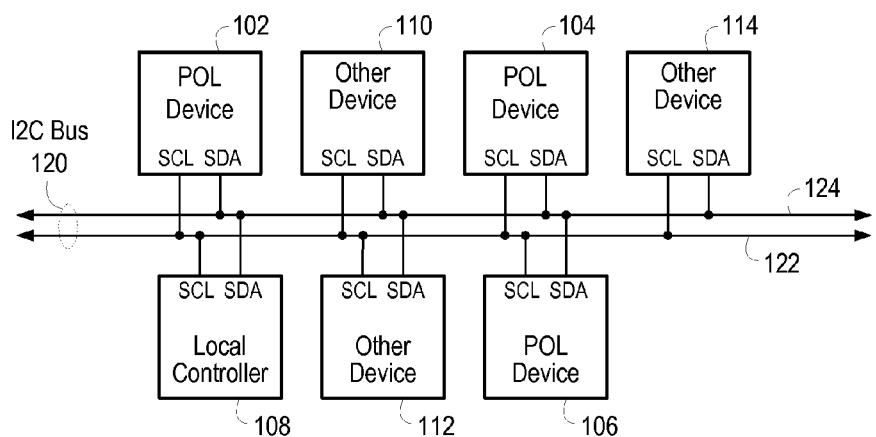
FIG. 2 shows a typical system configuration with POL and non-POL devices and a local controller coupled to an I2C bus.

FIG. 2 shows a typical configuration in which multiple POL devices 102, 104, and 106 are coupled together via I2C bus 120 comprising data signal (SDA) line 124 and clock signal (SCA) line 122, which also couples a Local Controller 108 and other devices 110, 112, and 114 that are not directly related POL devices 102, 104, and 106. Each of devices 102, 104, 106, 110, 112, and 114 must be responsive to a unique address, which is its slave address. The slave address may be defined for a device or programmed into a device in several possible ways. For example, the address may be "hard wired" into the device by design. Alternatively, the address may be determined by the connections of one or more pins on a device, with the one or more pins dedicated to selecting the address to which the device will respond. In yet another configuration, the device may contain non-volatile memory into which the slave address as well as other configuration information may be programmed during manufacturing or during a configuration operation performed to prepare the device for use in a particular system or application.

Figure 3:
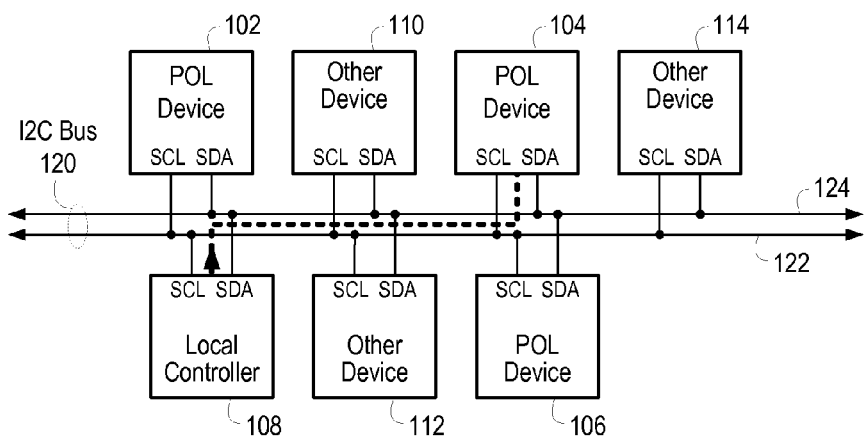
FIG. 3 illustrates a simplified transfer of a packet being from a Local Controller to a POL device.

During typical operation, Local Controller 108 may address each POL and/or other device by its unique slave address as required, writing control information and reading status and data. FIG. 3 is a simplified illustration of a packet being transferred from Local Controller 108 to POL device 104. Each of the devices on shared I2C bus 120 may receive the packet sent by Local Controller 108. However, only POL device 104 would recognize the address at the start of the packet as its own. POL device 104 would thus respond to the packet initiated by Local Controller 108, receiving or supplying data as required.

Figure 4:
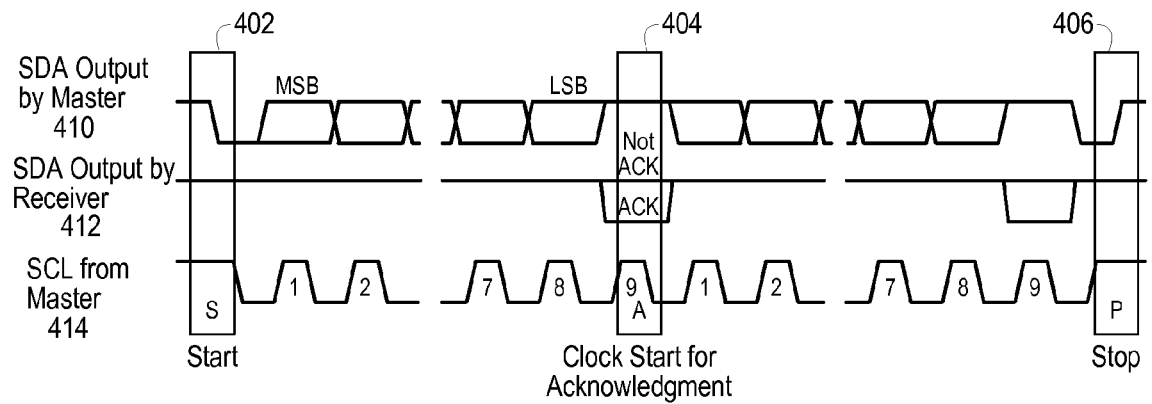
FIG. 4 shows the basic bus waveforms on the shared SDA and SCL bus wires of an I2C bus.

FIG. 4 show the basic bus waveforms on the shared SDA (410 and 412), and SCL (414) bus wires. The bus connections of each device connected to the bus are typically of an "open-drain" nature, with an external pull-up device, generally a resistor or current source (not shown), on each shared signal wire. Each device connected to the bus has the ability to drive the signals to a low or logic 0 level or to not drive it at all. If no device is "pulling" the bus low, the external pull-up typically causes the bus signal to remain at a high or logic 1 level. Also illustrated in FIG. 4 are, a transmission start 402, corresponding for example to "S" 20 in FIG. 1, the MSB through LSB of a slave address byte, corresponding for example to "ADR" 22, and acknowledge 404, corresponding for example to "A" 26, followed by a data byte, corresponding for example to Data2 38, and a stop 406, corresponding for example to "P" 40.

Another bus standard, developed after the I2C bus standard, is the SMBus (System Management Bus), which is backward compatible with the I2C bus standard while introducing additional features to support error detection, hazard recovery, and dynamic address assignment among others. It should be noted that both the I2C bus and the SMBus have predefined means for identifying a slave or destination device, but neither has predefined means for identifying the master or source of a bus transaction. Yet another bus standard, the Power Management Bus (PMBus) is a variant of the SMBus, which is targeted at digital management of power supplies. Like SMBus, the PMBus is a relatively slow speed two-wire communications protocol based on $I^2C$. Unlike either of those standards ($I^2C$ and SMBus), the PMBus defines a substantial number of domain-specific commands rather than just specifying how to communicate using commands defined by the reader.

Device-to-Device Communication Bus (DDC Bus)

A unique approach may be devised to couple POL regulators to a system SMBus, and enable each POL regulator to use the SMBus to send packets to its own respective SMBus address with other POL devices in the group configured to accept and process all group transmissions. Limitations to this approach include the uncertainty over available bandwidth on the SMBus, the low baud-rate (100 kbaud) and the frequent undesirability of multi-master SMBus systems. Therefore, a device-to-device communication (DDC) Bus may be configured to support event communications to implement distributed power management functions among a group of devices, e.g. POL regulators/devices. The DDC bus may replace PMBus event packets as the primary communication means between POL regulators. In other words, POL regulators may be coupled to the DDC Bus for communicating with each other to perform coordination and at least partial control of the power management functions of the POL regulators.

DDC Bus Overview

Figure 5:
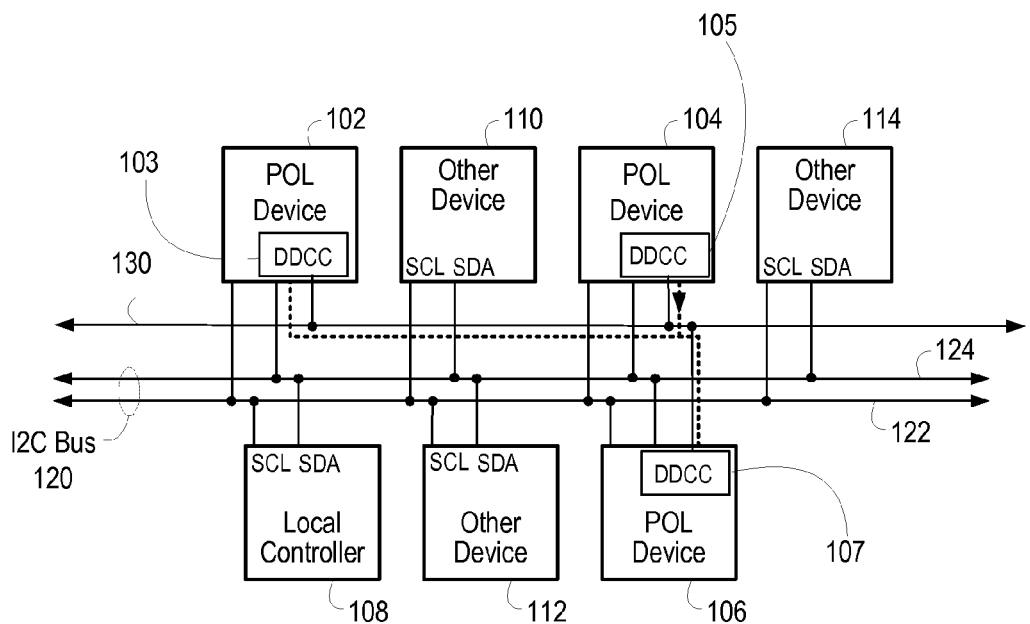
FIG. 5 shows one possible way of linking of POL devices using a Device-to-Device Communication (DDC) Bus.

The Device-to-Device Communication (DDC) Bus may be configured as a peer-to-peer communication bus used for all digital POL-to-POL controller communication. As shown in FIG. 5, POL devices 102, 104, and 106 may all be coupled to DDC bus 130, which may facilitate packet transfer between POL devices 102, 104, and 106. POL devices 102, 104, and 106 may transmit packets over bus 130 to communicate events, and may further transfer data to perform, for example, sequencing, fault spreading and current sharing operations. Each POL regulator may include a DDC Controller configured to enable the POL regulator transmitting and receiving packets over the DDC Bus. In FIG. 5, POL device 102 may include a DDC Controller (DDCC) 103, POL device 104 may include a DDCC 105, and POL device 106 may include a DDCC 107. DDCC may include control HW, firmware, and registers, for facilitating DDC Bus access. Certain functionality of the control HW, firmware, and registers will be described in more detail below.

Packets may consist of two to four bytes transmitted by any device in the group and received by all other devices in the group. The DDC hardware controller within each POL regulator (102, 104, 106) may also be configured to support transmission and reception of single byte packets. Transmission and reception may be fully supported by the DDC hardware controller within each POL regulator. Firmware may be configured to write only the bytes it wishes to transmit to buffer registers in the DDC Bus hardware controller, and initiate transmission by writing the number of bytes to transmit to the DDC transmit control (DDCTXCN) register. Firmware may be configured to have no further involvement during packet transmission. Upon reception, complete packets and status information may be buffered and presented by the DDC Bus controller (which may comprise control hardware). Firmware may be configured to clear the packet status to free all packet buffer resources for the next packet. Packet integrity may be protected by byte parity and the ability of each receiving device (POL regulator) to initiate an abort of a packet when a parity error is detected. The transmitting device may note the abort and may retry packet transmission. Arbitration, packet priority levels and a fairness mechanism may be configured to allocate bus access and bandwidth equitably and flexibly. A loop-back feature may enable all devices, including the transmitting device, to receive and recognize the packet, and perform one or more functions according to the content of the packet. This feature may operate to greatly facilitate coordinated actions by members of the POL regulator group, e.g. functions such as POL ramp initiation, current balancing and orderly shutdown when it is desirable for each device to begin some action in a closely coordinated manner. In addition, the DDC event logic may also include a synchronization mechanism, which may be implemented in hardware.

The definition of the DDC Bus protocol may also include the ability to embed PMBus protocol transactions within DDC Bus packets, fully supporting reading and writing PMBus parameters over the DDC Bus. The DDC Bus controller may be configured to initialize on reset to a disabled state determined by an initial value (e.g. 0) in the quarter period field in a DDC configuration (DDCCONFIG0) register.

DDC Bus Protocol

The DDC Bus protocol may facilitate transmission of a 2 to 4 byte packet by any device sharing the bus. All devices on the bus may be configured to monitor the bus, receiving all packets transmitted by other devices and recognizing when they may initiate transmission if they desire to do so. To simplify the design of the bus protocol, packets may be transmitted only by a POL device, and POL devices may be configured to not read any data from a non-transmitting POL device. The packet may begin with a unique address value in the first byte of the packet to identify the sender and allow hardware arbitration to uniquely select one of any number of senders who may wish to transmit and begin transmission simultaneously. The first byte may typically be organized as one or more bits of packet priority followed by the sending (transmitting) device's unique bus address. FIG. 6 shows some examples of possible DDC packet types. A one-byte packet 102, two-byte packet 104, three-byte packet 106, and four-byte packet 108. A packet may be transmitted subsequent to a Full Stop (Fs), End (En) or Idle (I) state. The first bit may be a start (S) bit, followed by priority bits (PRI), which may be reserved for special use (see further below), and the address bits of the transmitting device. The packet may end with a parity bit (P) and stop bit (S), and full stop bit (Fs) as the final bit. As shown, in case the packet contains more than one byte (e.g. packets 104, 106, and 108), each byte may end with the parity bit and a stop bit, with the subsequent byte beginning with the start bit and the information content (BYTE1, BYTE2, etc.). Further aspects of the packets and packet structure of the DDC Bus will be further described below.

PMBus and DDC Bus

When using a PMBus (or SMBus) for coupling POL regulators, a command code may be defined for peer-to-peer event communication among POL regulators. A pair of registers (an address register and a corresponding address mask register) in the SMBus controller within each POL regulator may be configured to recognize the device's (POL regulator's) own address, by masking a specified number of the LSB (least significant bits) of the address to establish an address group. The size of the address group may be defined in firmware. Some exemplary systems may include 8 devices, while other exemplary systems may be configured for 16 devices/addresses. The group size may be set as required by the system specifications/requirements.

SMBus event communication (between at least POL regulators) may take place as follows. To send an event, a device may transmit a packet to its own address (i.e. it may target its own address in initiating the bus operation) with the command code "event". The first two bytes of the transmitted packet—i.e. the Address and Command bytes, respectively—may result in all POL devices in the identified address group receiving and recognizing the packet. In other words, the address/address-mask configuration may lead to an address match for any device within the defined group. Each device receiving the packet may recognize the event code and accept the packet, but so far only recognize that it's a POL event from a POL device with the given SMBus address. If the packet command was not an event or a DMA command, the other POL devices may ignore the packet. There may also be a provision to ignore DMA packets even when there is an address/address-mask match. The byte following the event code may be the actual code for the event itself. For example, codes such as POWERGOOD, POWERDOWN, FAULT and RETRY may be used to support sequencing and fault spreading. The address byte in the packet may provide the sender's address, which may be used selectively for sequencing (e.g. one POL regulator waiting for POWERGOOD [code] from a POL device having a specific SMBus address) and to keep track of faulting on the bus (e.g. a POL device at a first address reports a FAULT, and a POL device at a second address reports it is ready to RETRY). This method of communication therefore uses three main pieces of information: the transmitting device's address, a code identifying the packet as an event packet, and a code identifying the specific event itself.

Communication over the DDC Bus: Transmitting Device's Address

The first byte of a DDC Bus packet may be specified to be unique and hold the transmitting device's address or identification (see FIG. 6, DeviceID). In other words, the first byte in a DDC Bus transaction may be the address that uniquely identifies the transmitting device. The address may be required to be unique, to allow the hardware to not have to perform bus arbitration following the first byte. In other words, when the address is unique, the hardware may have to perform arbitration only during the first byte. However, in a communication model where the sender (transmitting device) needs to be identified, this doesn't impose an undue restriction. The SMBus address may provide the basis for the DDC Sender ID (identification), but the full SMBus address may not be required. For example, in order to support a population of up to 32 devices on a given DDC Bus, five bits may be sufficient to provide enough unique addresses (identification codes). These bits may be the five least significant bits (LSBs) of each device's respective SMBus address (assuming those are the bits which are unique among them). Using fewer than a limited number (e.g. eight) bits may provide an advantage, freeing up the unused bits to be used for other purposes, for example by the firmware protocol. In one set of embodiments the unused bits may be used to define priority codes (see FIG. 6, PRI), e.g. for fault spreading, to allow a device that is transmitting a fault event to win arbitration, and transmit (send) its packet ahead of any other pending transmitting devices with less time critical communication. In one embodiment, a maximum group size may be selected, and firmware may be coded to support that maximum groups size. For example, in one set of embodiments, a maximum group size of 32 might be high enough, while in other embodiments it may be safer to increase the maximum group size to 64. In one set of embodiments, the DDC Address (DDCADDR) byte may be configured by firmware with the low 'N' bits (where N is the number of bits used, starting from the LSB) of a device's SMBus address, and define a set of priority bits for other uses for the remaining (i.e. 8-N) most significant bits (MSBs).

Communication over the DDC Bus: Identifying a Packet as a Power Management Function (Event)

Since all packets transmitted on the DDC Bus may be event communications related to power management functions, there is no need for a byte to specify this as distinct from other types of communication on the bus.

Communication over the DDC Bus: Specific Event Code

The second byte of a DDC Packet may contain the specific event codes, which may the same or similar to event codes also used on the SMBus—e.g. POWERGOOD, POWERDOWN, FAULT and RETRY (see FIG. 6, BYTE1, BYTE2, etc.). Current sharing events may also be added to this list, as well as any other event communication to be implemented in the future. Each single-byte SMBus code may translate to a 2-byte DDC packet. Current sharing may include transmitting current measurement values in the $3^{rd}$ and $4^{th}$ bytes of a DDC packet. Other data communicated over the DDC Bus may also use the optional $3^{rd}$ and $4^{th}$ packet bytes, resulting in a possible 256 event packet types, some with one or two additional bytes of data or configuration, some without. This may provide sufficient support for a level of complexity that may evolve with various POL systems. In one set of embodiments, even if the limit of 256 event packet types is reached, verbose information may also be encoded in a series of packets.

For example, if not all the priority bits in the address byte are defined and uses, one or more of those bits may be configured to play a role in defining groups of packets for more verbose communication. To that end, the device address may be shifted up one bit in the address byte, and a specific bit, e.g. bit 0 of the address may be reserved for some form of packet extension coding.

Communication over the DDC Bus: DMA

Current sharing may use DMA packets to directly deposit data into memory, when using previously available bus protocols, for example SMBus. The DDC Bus may be configured to have no DMA capability. It may use the non-maskable interrupt (NMI) for the receive interrupt, guaranteeing immediate response by the firmware to a DDC packet reception. The bus controller (within the POL regulator) may also be configured with loopback capability, allowing synchronization among a group of devices to be satisfied by the transmitter responding to its own packet at the same time that all group members also process the packet.

Packet Structure and transmission for the DDC Bus

As previously shown in FIG. 6, DDC Bus Packets may consist of 2 to 4 bytes. The first byte may be the Address byte and may be required to have a unique value among all devices on the bus. Arbitration may be performed during the transmission of the Address byte in a manner that always allows one packet to be sent correctly when several devices contend for the bus. A fairness mechanism may be implemented to prevent devices that may always take precedence over other devices (for example, by virtue of having a favorable address with respect to the arbitration algorithm) from repeatedly transmitting, and thereby keeping other contending devices from gaining ownership of the bus. The fairness mechanism may prevent one device from monopolizing the DDC bus, by forcing each device to wait for the bus to become idle once it has transmitted its packet(s). The bus being idle may be indicative of all other devices (that were transmitting packets) having completed their respective packet transmissions, leading to the burst of packets reaching an end. The $2^{nd}$ through $4^{th}$ bytes of a packet may be optional and may be referenced as Byte1 through Byte3 respectively (see FIG. 6). The number of bytes may be selected during packet transmission initiation (e.g. by firmware), by writing to a DDC Bus transmit control (DDCTXCN) register. All bytes within the packet may begin with a Start bit, followed by the 8 data bits of the byte, the most significant bit (MSB) transmitted first, followed by an Even Parity bit. Bytes within a packet may be separated by a single Stop bit.

One example of a more detailed diagram of one embodiment of a two-byte DDC packet is shown in FIG. 7. The numbered boxes in the packet diagrams represent the states of a bit-counter state machine (BCSM) that may be configured within the DDC Bus controller (within each device). The BCSM may manage interpretation of the sequence of bits and symbols on the bus. The definition of the states and their respective codes for the embodiments shown in the figures is found in table 300 of FIG. 8.

Packets may be grouped into bursts as part of the priority/fairness arbitration scheme. Within a burst, a device may be allowed only a single packet transmission (unless firmware is sending a priority packet and chooses to invoke a hardware capability to overrule the priority/fairness scheme). Packets within a burst may be separated by two Stop bits, described in the Figures as a 'Full Stop'. One example of packets within a burst transmission 400 is shown in FIG. 9.

Figures 10, 11:
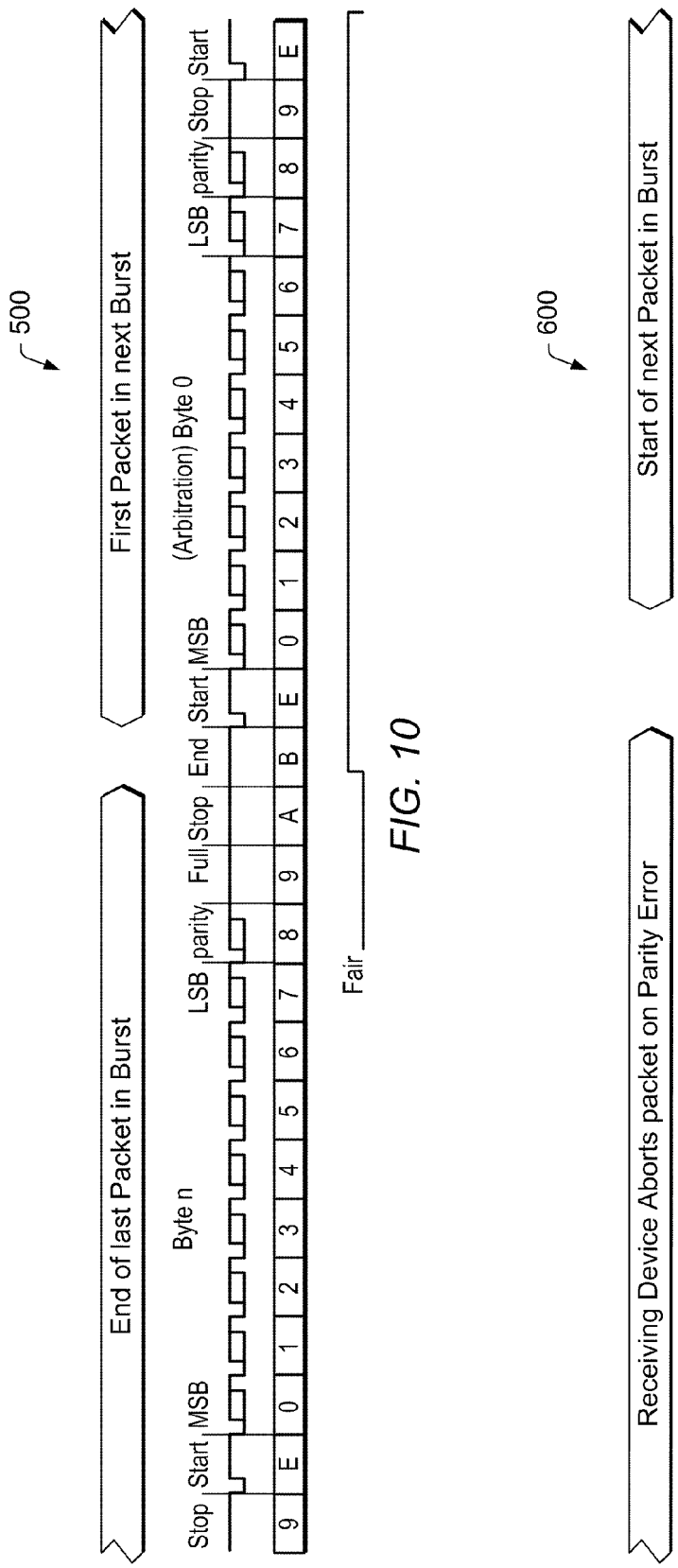
FIG. 10 shows one example of separate bursts and the effect of a priority/fairness mechanism on a data transmission burst on a DDC Bus.
FIG. 11 shows one example of a receiving device aborting a packet on parity error during a DDC Bus packet transmission.

Bursts may be separated by three or more Stop bits. A burst may end when there are no more packets to transmit, or when each device wishing to transmit is inhibited from transmitting a second packet within the Burst (for example by the priority/fairness scheme). The bus may then remain high for at least one additional bit time, which each controller may recognize as terminating the burst. Each device's controller may include a 'Fair bit', which the device may set at this time, re-enabling transmission for all devices on the bus. One example of separate bursts and the effect of a priority/fairness mechanism on a data transmission burst 500 are shown in FIG. 10. Once all devices have finished transmitting, they may wait for their respective 'Fair bits' to be set to re-enable transmission.

All devices on the bus may be configured to receive all packets. Parity may be checked by every receiving device as each character is received. Error detection and recovery may be performed by the receiving devices, which may force the packet to be aborted when detecting a parity error. Bus operation may not be affected regardless of whether any single receiving device aborts a packet or all receiving devices abort a packet. One example 600 of a receiving device aborting a packet on parity error is shown in FIG. 11. In the example, the receiving device detects the parity error based on the parity bit following Byte n, and drives the 'ABORT' bit following the stop bit. In response to this, the transmitting device aborts the transmission, and all devices recognize Abort as a packet error. A new packet from another transmitting device may continue the burst transmission after the full stop, and the transmitting device of the aborted packet may retry. In one set of embodiments, the system may be configured to stop on an error (for example by setting a stop-on-error bit), in which case the transmitting device of the aborted packet may not retry transmitting the previously aborted packet. The stop-on-error (STOPONERR) bit may be included in the DDC configuration register of the device.

Bus Data and Symbol Representations

Packets may be framed and transmitted using four symbols, each of one bit time duration. Reliable communication on the bus may be achieved through the system clocks, which may be local to each device on the bus, matching to within a specified percentage in the range of ±10%, which may allows individual devices to specify their clock accuracy to ±5%. '1' and '0' data symbols may be transmitted through pulse width modulated encoding. Logic '0' may thus be represented by driving the bus low for the first ¼ bit time, followed by driving the bus high for ¾ bit time, and logic '1' may be represented by driving the bus low for the first ¾ bit time, followed by driving the bus high for ¼ bit time. The Start bit, which begins each byte, may be coded as a logic '0'. The stop bit may include no low time, and the bus may remain high for a full bit time. The abort symbol may be transmitted by driving the bus low for one full bit time. Those skilled in the art will appreciate that these are exemplary implementations, and that bus data and symbols may be represented in alternative ways in keeping with the embodiments described within. For example, in alternative embodiments, logic '1' may be represented by driving the bus low for the first ¼ bit time, followed by driving the bus high for ¾ bit time, and logic '0' may be represented by driving the bus low for the first ¾ bit time, followed by driving the bus high for ¼ bit time, etc. In addition, a baud-rate value may be set and used to time the duration of the four phases within each bit-time of bit transmission and reception.

A Start, Data or Parity bit may begin with a falling edge, with the bus held LOW (low) for a nominal ¼ period. If the symbol is a Start bit or the data value is '0', the bus may return HI (high) for the remaining ¾ periods of the bit time. If the data value is '1', the bus may remain LOW for ¾ periods, then return to HI for the final ¼ period. The bus may always remain LOW for the first ¼ period of the bit time and HI for the final ¼ period when sending data and parity bits. The Stop bit may be recognized as the bus being HI for a full bit time, i.e. four ¼ periods, following a parity bit. A single Stop bit may be used to separate data bytes within a packet. Two Stop bits may separate data packets within a packet burst. Three or more Stop bits may be recognized as the end of a burst.

Bit Synchronization and Sample Timing Parameterization

A DDC Bus controller, whether receiving or transmitting, may synchronize its bit-timing counter to the observed falling edge on the DDC Bus pin. The initial counter value on an observed falling edge may be set in a configuration parameter (called the TIMER PRELOAD parameter) in the DDCCONFIG1 register (see further below regarding the control registers). The count or time at which the data value is sampled may be delayed from the middle of the ideal bit timing by another configuration parameter (called the SAMPLE DELAY parameter), also in the DDCCONFIG1 register. These parameters may enable firmware to compensate for actual fall and rise times of the bus as well as input synchronization delays in the input logic.

Arbitration and Priority

As a peer-to-peer shared bus, the DDC Bus may feature arbitration to begin each packet transmission in order to resolve simultaneous attempts to transmit by multiple devices. Arbitration may be performed on the DDC Bus during the transmission of the first byte of each packet, taking advantage of the fact that the first byte, that is, the DDC address byte is a unique value for each device on the bus. In one set of embodiments, devices may drive the bus with open-drain outputs. In other words, they may force the bus low, but not high. Therefore, if multiple devices simultaneously attempt to transmit data onto the bus, each time a device is trying to drive a "low" value, but there is a "high" value on the bus, it may be indicative that another device is also trying to transmit data onto the bus. The bus may be pulled high by an external device (e.g. a resistive pull-up) when no devices are driving the bus low. Arbitration may be performed as each device controller monitors the data value on the DDC Bus while it is transmitting the first byte of the packet. If a data bit on the bus does not match the data bit it is driving, loss of arbitration may be recognized and the device may immediately stop transmitting. By the end of the first byte, the uniqueness of all device addresses would guarantee that only a single device wins arbitration and completes its transmission. Arbitration insures a "winning" device and that the winning device completes its packet transmission, without losing transmission time to arbitration.

Data may be transmitted most significant bit (MSB) first, with '1's dominant on the bus. In one embodiment, arbitration may be configured such that the device with the highest numeric value in its first byte wins arbitration and successfully transmits its packet. The bus protocol may also include a fairness mechanism to insure one or several devices cannot monopolize the bus. The unique values of the first byte (e.g. 256 unique values in one preferred embodiment) may set a limit to the number of devices on a single bus, but practical considerations in other embodiments may further limit the maximum number of supported devices to a lower number, e.g. 32 devices. In case of 32 devices, 3 unused bits in the first byte (i.e. in the Address byte) may be used by firmware as priority bits. The priority bits may be specified as the 3 MSBs of the Address byte. This may give the firmware a degree of control over bus access latency for more critical events. Hardware may be configured to ignore additional uses of the Address byte, and simply implement the arbitration mechanism during transmission of the Address byte. A transmitting device may thereby monitor the bus bit value as it is transmitting the Address byte. Should the data value observed by the transmitting device not match the transmitting device's desired transmit value, the transmitting device may recognize loss of arbitration and suspend transmission to retry once the packet is complete. The receive function in every device, including transmitting devices that are losing arbitration, may accept the packet as a normal received packet.

Fairness

As previously mentioned, the arbitration scheme may also include a fairness mechanism to insure one or several devices cannot monopolize the bus. Packets on the bus may be conceptually grouped into bursts. A burst may consist of one or more packets, with each packet separated from the next packet by exactly two Stop bits (e.g. see FIG. 9). Bursts may be separated by three Stop bits or a Bus Idle condition (e.g. see FIG. 10). The Bus may be recognized as idle when three or more successive Stop bits are recognized. The fairness mechanism may operate within a burst. Prior to the burst, either from an initial reset condition or the recognition of the Bus Idle condition, a 'Fair bit' in each device may be set to allow it to transmit its next packet. Once a device succeeds in transmitting a packet, its Fair bit may be cleared, inhibiting further transmission during that burst. The Bus Idle condition that ends the Burst may result in the Fair bit being set, re-enabling transmission. This may guarantee that every device wishing to transmit during the duration of a burst will succeed in sending a single packet. In one set of embodiments, the order of transmission may be determined by the competing devices' address and use of upper address bits for priority purposes. A bit may also be specified in the DDCCONFIG0 register (see further below for a more detailed description of the register interface) to permit firmware to override the Fair bit (e.g. set the Fair bit) when it is necessary to override the fairness mechanism, for example to promptly transmit a packet with high priority.

Error Detection and Abort

Each byte may begin with a Start bit, followed by 8 data bits, which may be transmitted MSB first. The data bits may be followed by an even parity bit and a stop bit (e.g. see FIG. 6). The parity bit may allow each receiver to verify data integrity by verifying the sense of the parity bit. The abort function may be configured to enable the receiver to notify the transmitting device (or transmitter) of a data error. A packet may be aborted by a receiving device (or receiver), which may hold the DDC Bus low, forcing an abort symbol while the transmitter is sending the Stop bit after the parity bit. The transmitter and all other receivers may recognize the presence of the Abort symbol (Bus low for the full bit time) versus the Stop symbol (Bus high for the full bit time), and may record the aborted packet status. The default transmitter configuration may be to automatically retry packet transmission without notifying the firmware. It may be configured by firmware to stop on an abort error and report the error to firmware. After forcing the abort symbol for one bit time, the receiver(s) may release the bus. After two Stop bits, the Burst may continue. Unless a specified parameter (called the STOPONERR parameter—stop on error) is set in the DDCCONFIG0 register, the transmitter may automatically retry transmitting its packet.

Interrupts

The DDC Bus receive interrupt may be signaled to the central control element, e.g. an embedded processor in each device as a Non Maskable Interrupt (NMI). This may guarantee high service priority so that received packets are handled promptly, always avoiding the potential for a receive packet overrun. However, the hardware controller may be configured to detect and report a receive overrun occurrence. Normal operation may include keeping up with the rate of packet arrivals, filtering and processing DDC Bus communications as appropriate to the communicating device's controller function. For example, a controller in a current sharing group may be configured to recognize and accept all packets within its current sharing group, but may immediately discard current sharing packets from other groups. The use of the NMI for receive interrupts may guarantee an immediate response, thereby avoiding receive overruns. It may impose no greater burden than "normal" interrupt, with the possible exception of the inclusion—in the NMI service routine—of the debug support action of saving processor state to memory. This overhead may be avoided by re-coding the Interrupt Service Routine (ISR) to perform an initial test for the DDC receive interrupt on entering the ISR.

In keeping up with packet reception, firmware may be configured to assess its interest in the packet and clear the DDC Receive Status (DDCRXSTAT) register before hardware needs to store the first byte of a subsequent packet in the DDC Receive Address (DDCRXADDR) register. Copying DDCRXADDR and DDCRXSTAT, and clearing DDCRXSTAT may avoid overrun and may give firmware an additional character time to make a decision on its need to use the remaining bytes in the packet. (Again, see further below for more detailed information on the register structure of at least one embodiment of a DDC Bus controller).

The transmit interrupt may have no significant requirement for priority. Firmware may only require a timely notification of the completion of packet transmission. Both interrupts may have their own enable control bits in the interrupt enable register. Bit 4 may be configured as the DDC Transmit Interrupt Enable (DDCTXIEN), which may enable DDC Bus transmit interrupts when set. Bit 3 may be configured as the DDC Receive Interrupt Enable (DDCRXIEN), which may enable DDC Bus receive interrupts when set. DDCRXIEN may be set when the device is operating to avoid packet overruns and lost communication. A device which is not using receive interrupts may incur packet overruns but may not affect bus communication for other devices on the bus. Therefore, no operation analogous to clock stretching on the I2C/SMBus, for example, may be required on the DDC Bus.

The Bit Counter State Machine

Figure 12:
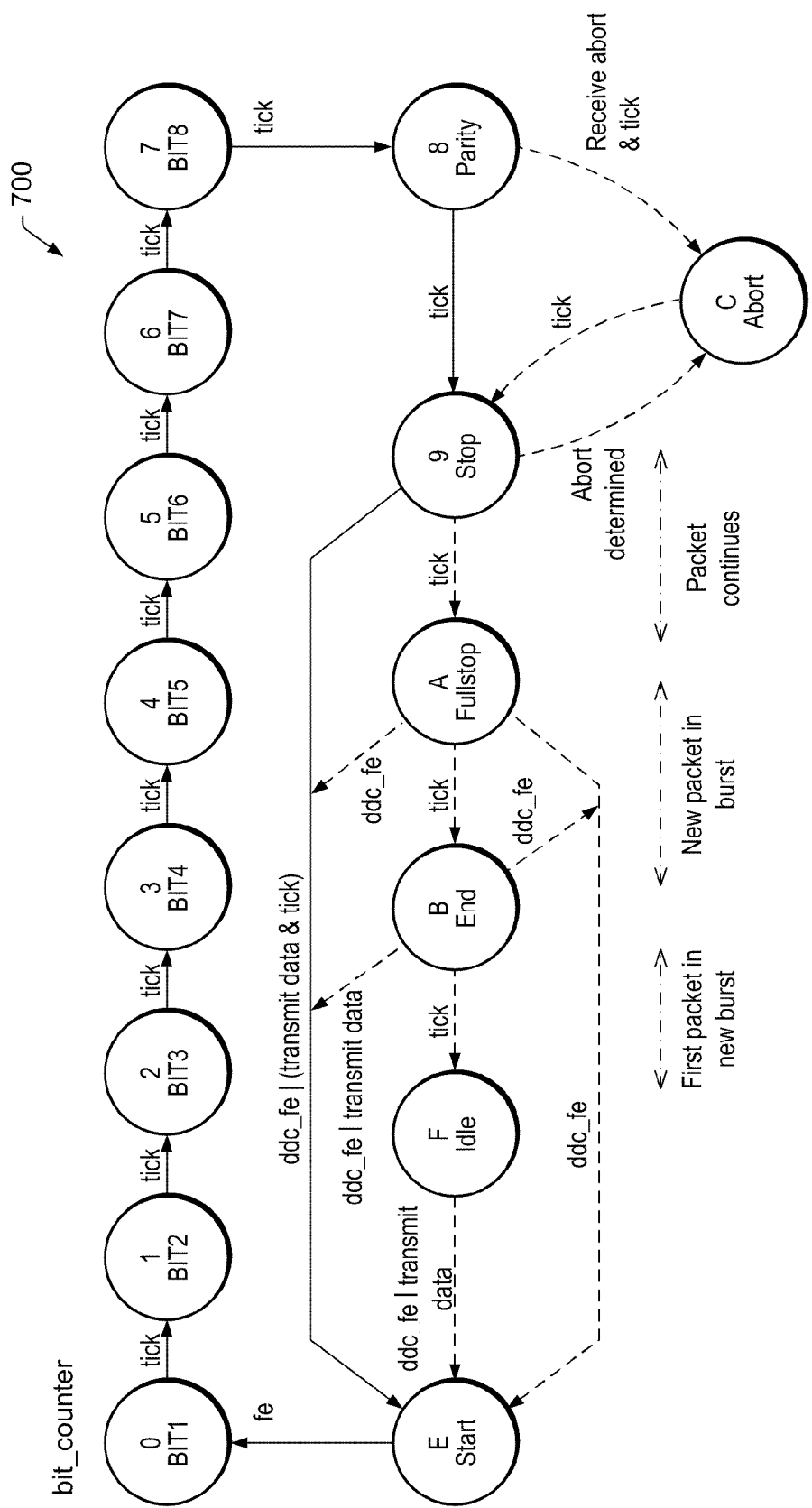
FIG. 12 shows a state diagram of one embodiment of the bit counter machine referenced in FIG. 8.

The bit counter machine may follow the activity on the DDC Bus bit by bit, maintaining state used in other machines within the controller to transmit and receive packets on the bus. The various states of one embodiment of the bit counter state machine were shown in table 300 of FIG. 8. FIG. 12 shows a state diagram of one embodiment of the bit counter machine. The bit counter states may include:

Idle (F)—bus has been high for three or more bit times

Start (E)—from Stop or Idle, initial transmission of a Start Bit, a '0'

'1' bit (0 through 7)—Falling edge—bus low for ¾ period (¼T), then high for ¼T '0' bit (0 through 7)—Falling edge—bus low for ¼T, then high for ¼T Parity bit (8)—A bit appended to the 8 data bits of a character generated by the transmitter so that there are an even number of '1's in the 9 bits of data+parity. Detection of odd parity by a receiver with Ignore Parity (IGNPARITY) set to 0 may cause the receiver to abort the packet.

Abort (C)—The bus may be held low for one bit time by a receiving device detecting a parity error. A single Full Stop following Abort may be treated as a normal Full Stop within a burst of fair packets—i.e. transmitters in a transmit pending state with their Fair bit set may begin packet transmission with arbitration immediately after the Full Stop.

Stop (9)—The bus may be high for one bit time following the parity at the end of a character, the packet continues.

Abort (C, transition from 8)—The bus may be driven low for one bit time, replacing the normal stop bit when a receiver detects a parity error.

Full Stop (A)—The bus may be high for two bit times following a parity bit or Abort. The Full Stop separates packets within a burst. The transmitter of the packet may clear its Fair bit. Devices whose Fair bit is set may be allowed to continue the burst.

End (B)/line Idle (F)—The bus may be high for three or more bit times following a packet. This may end a burst of packets and set the Fair bit in all devices on the bus.

Bit Timing

Internal details of bit timing may be implemented below the level of bit identification and counting. In one set of embodiments, a pulse width modulation format for bit transfer may be provided by generating four timing events per bit: send '1' (send_one), sample bit (sample_bit), send '0' (send_zero), tick (end of bit as determined by the 4$^{th}$ ¼T count within the bit—an observed ddc_fe [ddc_fe denotes a falling edge or high-to-low transition on the bus] in the 4$^{th}$ phase of the bit may also produce a tick). Send_one and send_zero may provide timing for transmission of data and may determine the transitions of the output when sending a '1' or '0' bit. A tick may provide timing for advancing bit counts and control state at the end of the bit time.

During arbitration, another device may initiate the falling edge of a new bit before a local tick would occur from bit timing counting to the end of the bit period. The falling edge within the final phase of bit timing may therefore also be recognized as a tick. The counter may be configured to resynchronize the bit timing (bit_timing) counter and asserts a tick on ddc_fe, should it occur first. The logic signal, sample_bit may be produced during phase 2 of the bit timing logic to time the sampling of the DDC Bus in receiving a '1' or '0'. The position of sample_bit may be within phase 2 by an offset parameter, called SAMPLE_DELAY. The delay may allow tuning of the sample point to account for low-to-high rise time of the bus. The bit timing function may be synchronized whether the device is transmitting or receiving by the detection of ddc_fe on the bus input. This event may load the timer preload (timer_preload) value into the bit_timing counter. This configuration parameter may be selected to account for the delay that is present from the device causing the ddc falling edge to its detection as an input. The delay may also include the bus fall time.

Figure 13:
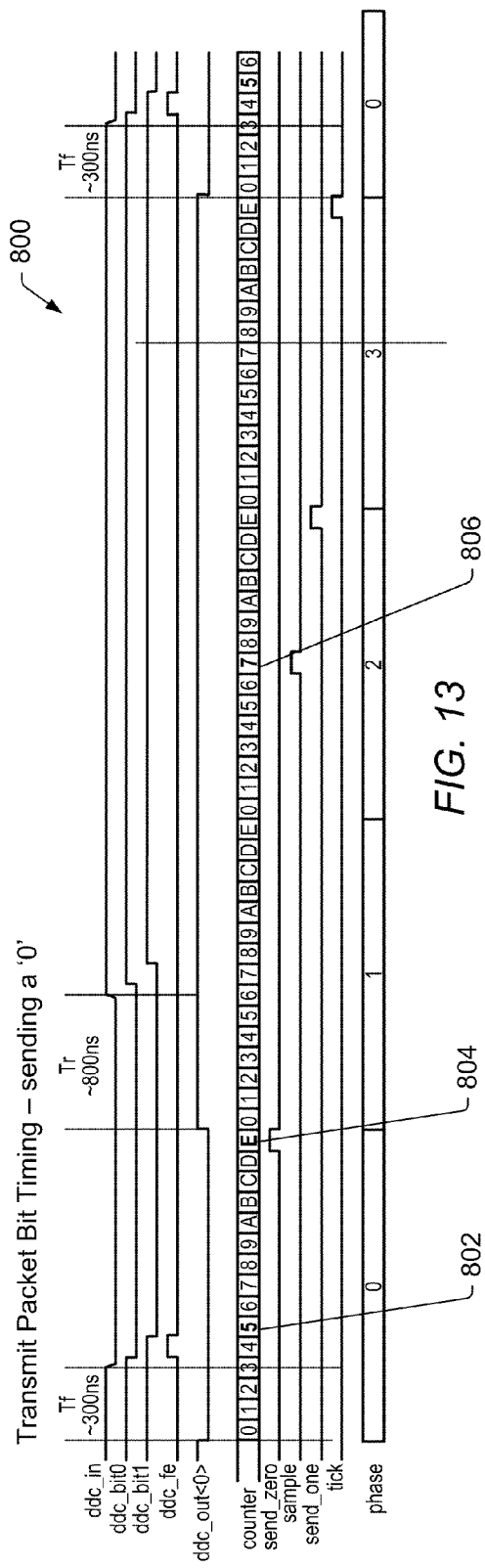
FIG. 13 shows a timing diagram for one example of transmit packet bit timing when sending a '0' on a DDC Bus.
Figure 14:
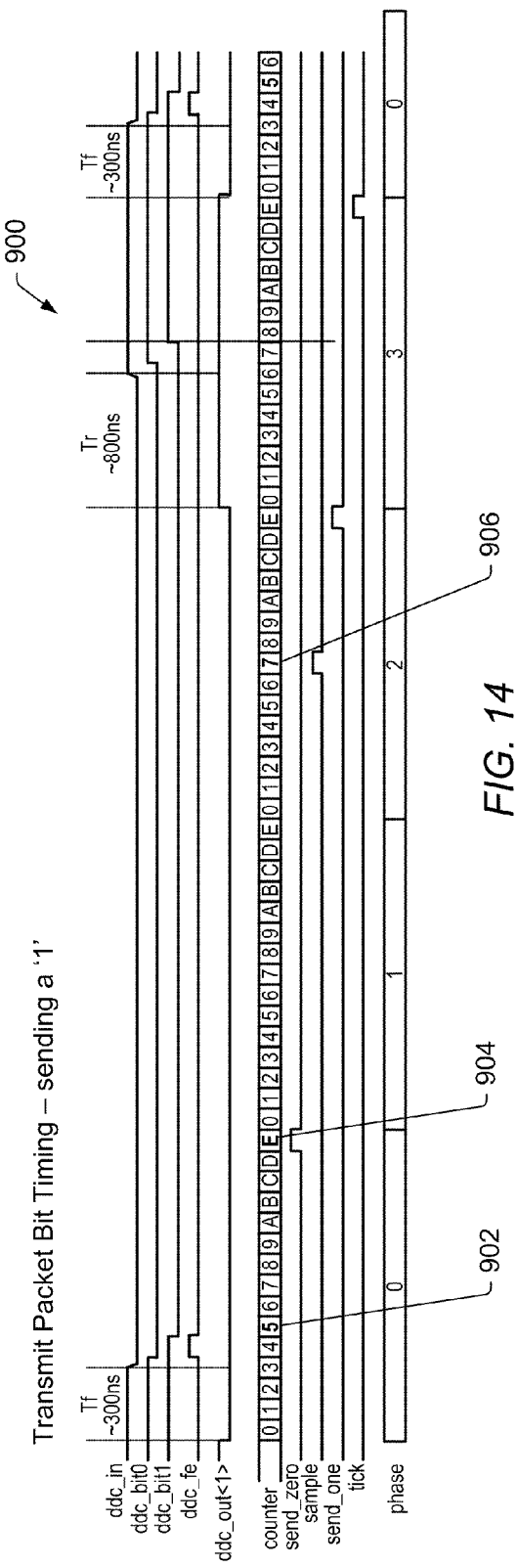
FIG. 14 shows a timing diagram for one example of transmit packet bit timing when sending a '1' on a DDC Bus.

FIG. 13 shows a timing diagram for one example of transmit packet bit timing when sending a '0', and FIG. 14 shows a timing diagram for one example of transmit packet bit timing when sending a '1'. As shown in FIG. 13, at state '5' 802 timer_preload value may be loaded on ddc_fe to compensate for ddc_out to ddc_fe delays. The ¼T configuration value appears at state 'E' 804, while at state '7' 806 the sample_delay may be chosen to center sample between '0' and '1' transitions. Similarly, in FIG. 14, at state '5' 902 timer_preload value may be loaded on ddc_fe to compensate for ddc_out to ddc_fe delays, the ¼T configuration value appears at state 'E' 904, while at state '7' 906 the sample_delay may be chosen to center sample between '0' and '1' transitions. The bit timing inputs in FIGS. 13 and 14 are ddc_fe, ddc_re and ddc_idle, the bit timing outputs are send_one, send_zero, sample_bit and tick, and the bit counter outputs are shown as bit_counter, (char=0:7) (parity=8).

Clock Rate Variation Between Devices

In one set of embodiments, the clock accuracy in POL devices may be specified as ±5%. Devices on the DDC Bus at opposite ends of this clock range may produce cases with an external device having either a 10% faster or a 10% slower clock than a given receiving or transmitting device. Within the bit time of a start, data or parity bit (all types having a pulse-width-modulated—PWM—format beginning with a falling edge) each transmitter and receiver may re-time its clock timing logic on the observed falling edge. The worst-case mismatch between transmitters and receivers for sampling one of these bit types may be 10% of ½ of the bit time. The clock mismatch may accumulate over two or three bit times at the ends of characters and packets where one or more stop symbols provide separation. The timing diagrams in FIGS. 15-20 illustrate timing mismatch cases for slower and faster external devices at the logic decision points within bit timing for continuing a packet within a burst, continuing a burst and beginning a new burst after the Fair state is re-asserted. Local and external bit counter state and phase within bit timing are illustrated for a 12.5% mismatch.

Figure 15:
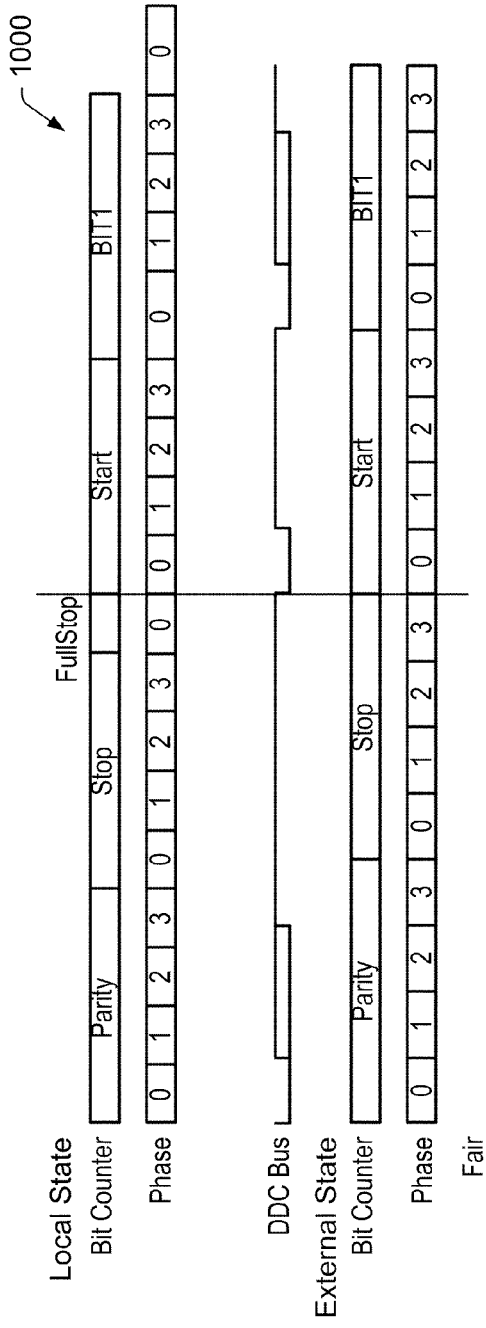
FIG. 15 shows a timing mismatch case with a latest packet continuation from a slow transmitter.
Figure 16:
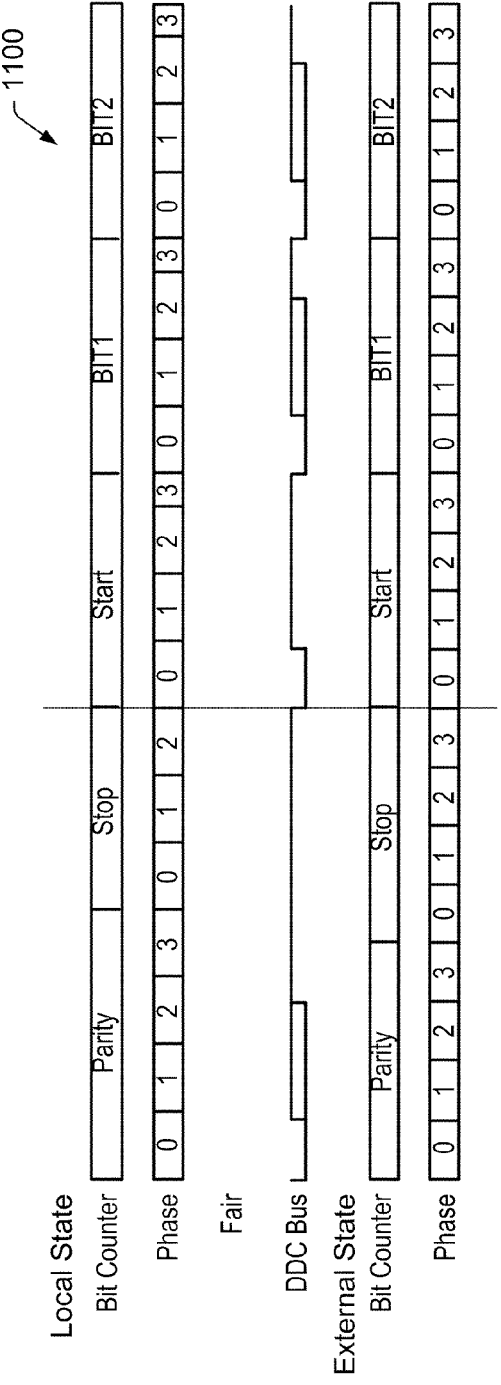
FIG. 16 shows a timing mismatch case with an earliest packet continuation from a fast transmitter.
Figure 17:
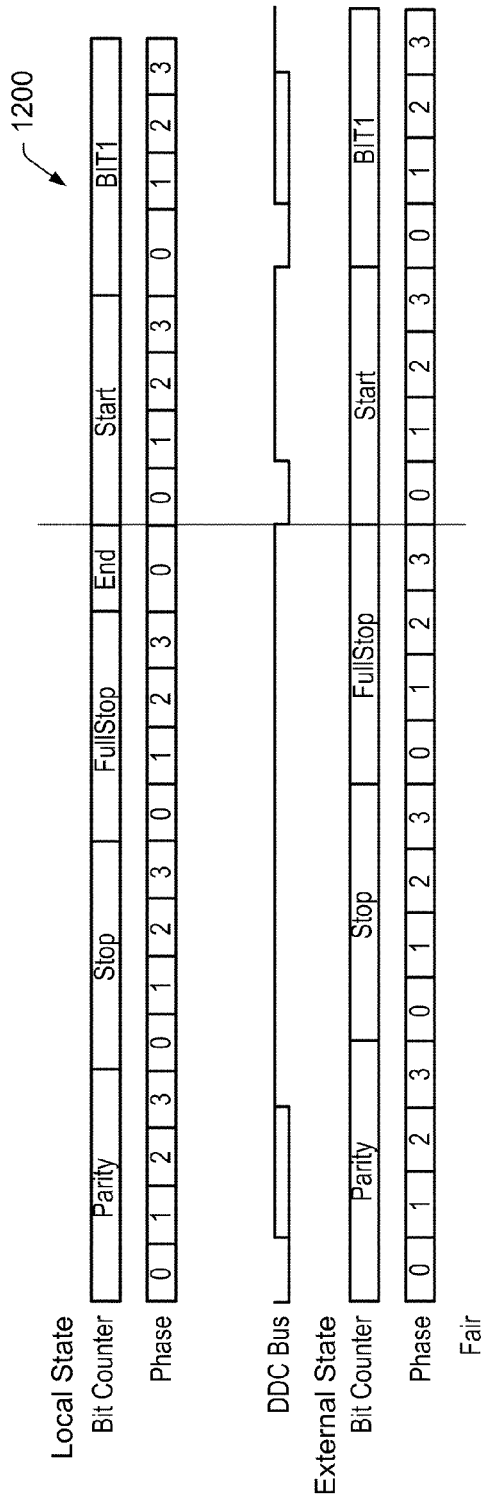
FIG. 17 shows a timing mismatch case with a latest packet start in burst from a slow transmitter.
Figure 18:
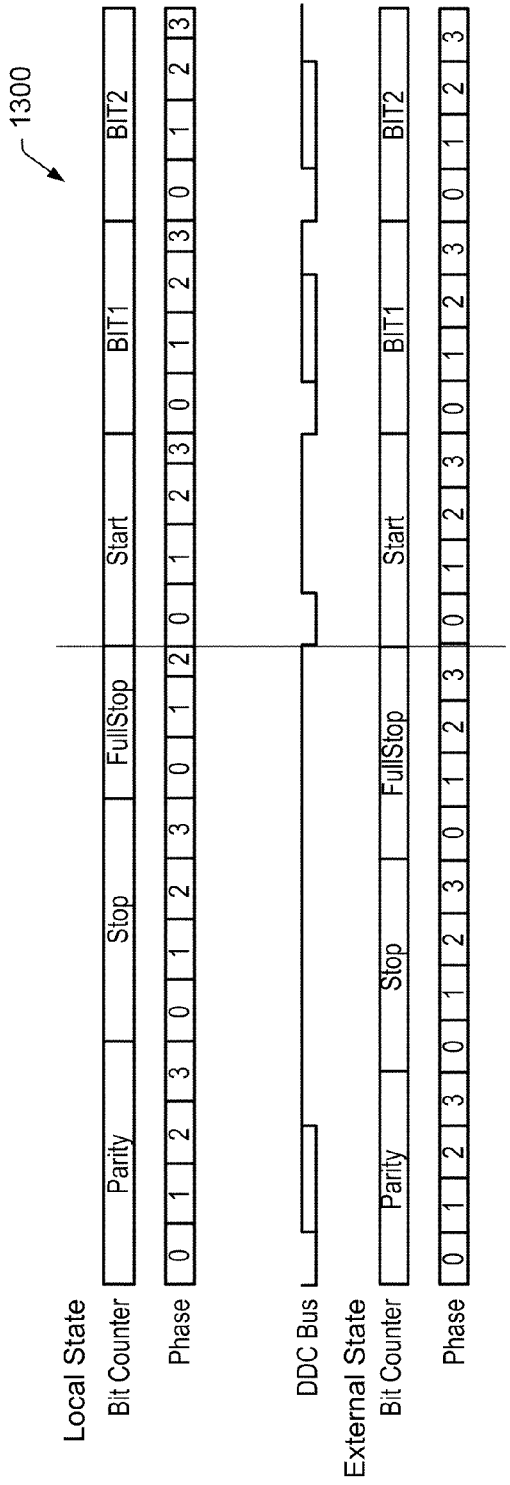
FIG. 18 shows a timing mismatch case with an earliest packet start in burst from a fast transmitter.
Figure 19:
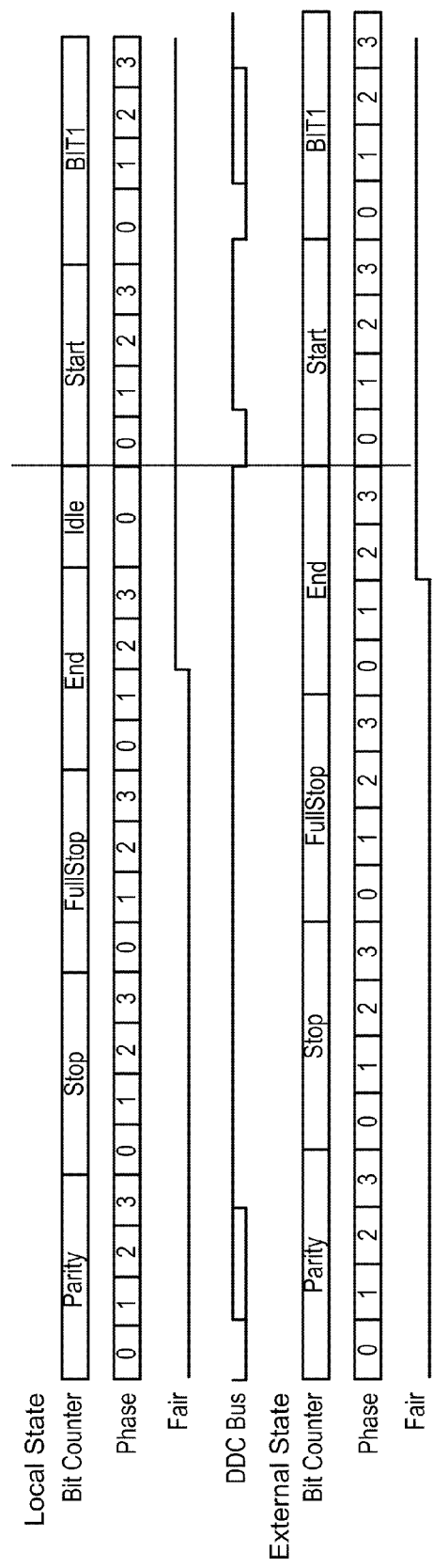
FIG. 19 shows a timing mismatch case with a packet start of new burst from a slow transmitter.
Figure 20:
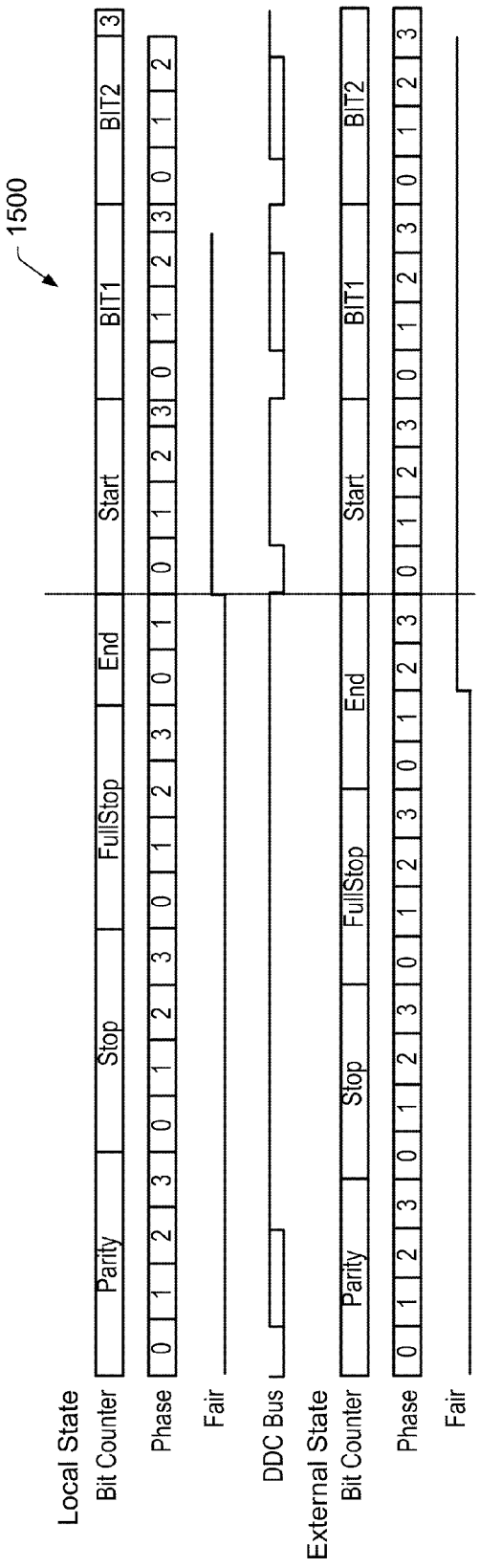
FIG. 20 shows a timing mismatch case with an earliest packet start in burst from a fast transmitter.

As shown in FIG. 15, the vertical line represents the latest packet continuation from a slow transmitter. In FIG. 16, the vertical line represents the earliest packet continuation from a fast transmitter. In FIG. 17, the vertical line represents the latest packet start in burst from a slow transmitter. In FIG. 18, the vertical line represents the earliest packet start in burst from a fast transmitter. In FIG. 19, the vertical line represents the packet start of new burst from a slow transmitter. In FIG. 20, the vertical line represents the earliest packet start in burst from a fast transmitter.

DDC Bus Register Interface

In describing various aspects of the operation of one embodiment of the DDC bus, various registers that may be configured in a DDC Bus controller have been previously referenced. The bus register interface of one embodiment of the DDC bus will now be described in more detail.

In one embodiment of the DDC Bus, packets of one to four bytes in length may be transmitted. This may allow the DDC Bus register interface to greatly simplify firmware interactions with packet transmission and reception relative to the SMBus interface.

For the SMBus, the firmware Interrupt Status Register (ISR) may have to deal with the transmission and reception of packets one byte at a time, maintaining packet state across multiple interrupts. Packet length may be open-ended. Packets may request data to be driven by the slave device within the packet, which may require firmware to process the packet as it is received and queue up data for transmission as requested. The complexities of the interactions and latencies in response by both master and slave may therefore require clock stretching to delay packet progress and allow firmware to "catch up" with the immediate demands of packet processing.

In contrast, the DDC Bus interface may include dedicated hardware registers to support the complete definition of a transmit packet and complete reception of a packet. When the transmission of the packet is complete, a single interrupt may inform firmware of the transmission status. When receiving packets, registers may contain the complete packet and its status. The packet data and status may be presented with a single receive interrupt at the highest priority using the Non Maskable Interrupt (NMI).

DDC Transmit Control (DDCTXCN) Register

FIG. 21 shows a table 1600 illustrating the structure of the DDCTXCN register according to one embodiment. The DDCTXCN register may be used by firmware to initiate transmission of a DDC packet. Firmware may write the two bit TXBYTES field to define the length of the packet after writing data to 1 to 4 of: DDCTXADDR, DDCTXBYTE1, DDCTXBYTE2 and DDCTXCBYTE3. The SEND bit may be set automatically as a side-effect of writing TXBYTES and may be reset by the DDC controller when the packet has been sent without error.

DDC Transmit Status (DDCTXSTAT) Register

FIG. 22 shows a table 1700 illustrating the structure of the DDCTXSTAT register according to one embodiment. As shown, fields 0-1 and 3-4 may be reserved, field 7 may be designated as the Transmit Done (TXDONE) bit, field 6 may designated as the Transmit Error (TXERR) bit, field 5 may be designated as the Transmit Parity (TXPARITY) bit, and field 2 may be designated as the Transmit Abort (TXABORT) bit. The TXPARITY and TXABORT error statuses may be set whenever detected during an attempt to transmit a packet, and may cause a transmit (TX) interrupt to convey the status to the host. The packet transmission may be automatically retried unless STOPONERR is set.

DDC Receive Status (DDCRXSTAT) Register

FIG. 23 shows a table 1800 illustrating the structure of the DDCRXSTAT register according to one embodiment. As shown, field 0-1 may be designated as the Receive Bytes (RXBYTES) bits, field 2 may be designated as the Receive Event (RXEVENT) bit, field 3 may designated as the Receive Overrun Error (RXOE) bit, field 4 may be designated as the Receive Framing Error (RXFE) bit, field 5 may be designated as the Receive Parity (RXPARITY) bit, field 6 may be designated as the Receive Error (RXERR) bit, and field 7 may be designated as the Receive Done (RXDONE) bit. RXPARITY may also be set when the receiver does not recognize a parity error, but the packet is aborted by another device.

DDC Configuration 0 (DDCCONFIG0) Register

FIG. 24 shows a table 1900 illustrating the structure of the DDCCONFIG0 register according to one embodiment. All devices on the bus may be configured to use the same baud-rate settings, with their internal clocks within ±10% of each other. This may assume a clock calibration specification of ±5% is met for each device. A hardware reset may set the Quarter Period parameter (field 0-3) to 0x0, disabling the DDC Bus controller. To use the DDC Bus, firmware may initialize the controller and set a Quarter Period value to set the baud rate. All devices on the bus may be configured to communicate at the same nominal baud rate. FIG. 25 shows a table 2000 with possible baud rate settings for the DDC Bus according to one embodiment.

The initial value of the Quarter Period field may be '0', disabling DDC Bus operation. This may permit use of the pin allocated on the device to the DDC Bus for other applications where the DDC Bus is not required. For example, the initial DDC capable integrated circuit may be used in existing product applications which have no DDC Bus and employ the DDC pin as a TACH input, for example.

DDC Configuration 1 (DDCCONFIG1) Register

FIG. 26 shows a table 2100 illustrating the structure of the DDCCONFIG1 register according to one embodiment. The Timer Preload and Sample Delay values may be less than the Quarter Period value.

DDC Event (DDCEVENT) Register

FIG. 27 shows a table 2200 illustrating the structure of the DDCEVENT register according to one embodiment. The value in this register may be compared with the address byte of received packets. If a match occurs, the RXEVENT status bit may be set in the DDCRXSTAT register, and a DDC Trigger hardware signal may be asserted if the Trigger Enable hardware signal is true.

DDC Status (DDCSTAT) Register

FIG. 28 shows a table 2200 illustrating the structure of the DDCSTAT register according to one embodiment. This register may be configured as a hardware debug aid and may not be required for normal transmit and receive operation. FIG. 29 shows a table 2400 with possible values for the TX (Transmit) Main State field of the DDCSTAT register according to one embodiment. FIG. 30 shows a table 2500 with possible values for the RX (Receive) Main State field of the DDCSTAT register according to one embodiment. FIG. 31 shows a table 2600 with possible values for the Bit Counter field of the DDCSTAT register according to one embodiment.

DDC Transmit Address (DDCTXADDR) Register

FIG. 32 shows a table 2700 illustrating the structure of the DDCTXADDR register according to one embodiment. This register may hold the address identifying the device, and may be transmitted by the device as the address for the bus transaction/operation in the first byte of a packet in a bus transaction.

DDC Transmit Byte 1 (DDCTXBYTE1) Register

FIG. 33 shows a table 2800 illustrating the structure of the DDCTXBYTE1 register according to one embodiment. This register may hold a first data byte that may be transmitted by the transmitting device following the transmission of the Address Byte.

DDC Transmit Byte 2 (DDCTXBYTE2) Register

FIG. 34 shows a table 2900 illustrating the structure of the DDCTXBYTE2 register according to one embodiment. This register may hold a second data byte that may be transmitted by the transmitting device subsequent to the transmission of the Address Byte.

DDC Transmit Byte 3 (DDCTXBYTE3) Register

FIG. 35 shows a table 3000 illustrating the structure of the DDCTXBYTE3 register according to one embodiment. This register may hold a third data byte that may be transmitted by the transmitting device subsequent to the transmission of the Address Byte.

DDC Receive Address (DDCRXADDR) Register

FIG. 36 shows a table 3100 illustrating the structure of the DDCRXADDR register according to one embodiment. The value in this register may be written by the DDC controller (DDCC) when the parity bit of the address byte of a new packet is sampled, and if RXDONE is not set. If RXDONE is still set from a previous packet, the address byte may be discarded and the overrun error status bit, RXOE may be set. On each additional data byte in the packet, if RXDONE is still set, the data byte may be discarded and the associated receive byte register may remain unchanged. At the end of the packet causing an overrun, if RXERR is not set, RXDONE may be set. The packet fragment, however much of it was written to the DDCRXBYTE registers, may be ignored by firmware as the DDCRXADDR byte may be considered lost. This may not present a severe limitation however, as Receive Interrupts may be handled through the Non-Maskable Interrupt which may have immediate priority on processor state and may always remain enabled. Although the Rx DDC Interrupt itself may be disabled, whenever it is enabled, a DDC Receive interrupt may be serviced in time to avoid an overrun unless there is a bug in firmware. The RXOE status may therefore be expected to serve primarily as a debugging aid.

DDC Receive Byte 1 (DDCRXBYTE1) Register

FIG. 37 shows a table 3200 illustrating the structure of the DDCRXBYTE1 register according to one embodiment. This register may hold the most recent first data byte that was received on the DDC Bus.

DDC Receive Byte 2 (DDCRXBYTE2) Register

FIG. 38 shows a table 3300 illustrating the structure of the DDCRXBYTE2 register according to one embodiment. This register may hold the most recent second data byte that was received on the DDC Bus.

DDC Receive Byte 3 (DDCRXBYTE1) Register

FIG. 39 shows a table 3400 illustrating the structure of the DDCRXBYTE3 register according to one embodiment. This register may hold the most recent third data byte that was received on the DDC Bus.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A system comprising;
   a bus; and
   a plurality of devices coupled to the bus, wherein the plurality of devices are configured to transmit and receive packets over the bus, wherein a leading byte of an initial packet in a bus transaction initiated by a transmitting device comprises an address uniquely identifying the transmitting device, and wherein each of the plurality of devices is configured to transmit logic data values over the bus through pulse-width modulated (PWM) encoding;
   wherein the transmitting device is configured to:
      monitor the bus as it is transmitting the leading byte of the initial packet;
      recognize loss of arbitration when, during transmission of the leading byte of the initial packet, a data value observed on the bus by the transmitting device does not match a value the transmitting device is attempting to transmit; and
      suspend transmission of the initial packet when loss of arbitration has been recognized.

2. The system of claim 1, wherein the transmitting device is further configured to retry transmission of the initial packet once transmission of a winning packet on the bus is complete.

3. The system of claim 1, wherein a receive function in each of the plurality of devices, including the transmitting device, is configured to accept the winning packet as a normal received packet.

4. The system of claim 1, wherein the leading byte of the initial packet comprises a priority code, wherein the priority code precedes the address in the leading byte.

5. The system of claim 1, wherein the address uniquely identifying the transmitting device is also indicative of a priority assigned to the transmitting device when attempting to transmit data packets onto the bus.

6. The system of claim 4, wherein the priority code comprises a plurality of bits.

7. The system of claim 1, wherein the initial packet comprises a plurality of bytes.

8. The system of claim 1, wherein a first bit of the leading byte of the initial packet is a start (S) bit, followed by one or more priority bits (PRI), followed by address bits representing the address uniquely identifying the transmitting device, followed by one or more of:
   a parity bit;
   a stop bit; or
   a full stop bit.

9. The system of claim 1, wherein the packets transmitted and received over the bus by the plurality of devices comprise event communications related to power management functions.

10. The system of claim 1, wherein a second byte of the initial packet comprises a specific event code corresponding to a specific power management function.

11. The system of claim 1, wherein each of the plurality of devices is configured with loopback capability, allowing synchronization among the plurality of devices to be satisfied by the transmitting device responding to the initial packet at the same time that other ones of the plurality of devices are also processing the initial packet.

12. The system of claim 1, wherein each of the plurality of devices is configured to wait for the bus to become idle once it has transmitted a packet, before transmitting another packet.

13. The system of claim 1, wherein in transmitting logic data values through PWM encoding, each of the plurality of devices is configured to:
   drive the bus low for a first ¼ bit time, then drive the bus high for ¾ bit time, to transmit a first one of two logic values.

14. The system of claim 1, wherein in transmitting logic data values through PWM encoding, each of the plurality of devices is configured to:
   drive the bus low for a first ¾ bit time, followed by driving the bus high for ¼ bit time to transmit a second one of the two logic values.

15. The system of claim 14, wherein each of the plurality of devices is configured drive the bus to a same value for one full bit time, to transmit an abort symbol over the bus, wherein the same value is either low or high.

16. The system of claim 1, wherein the bus comprises a single bus line.

17. The system of claim 1, wherein each of the plurality of devices comprises a bit-timing counter, wherein each of the plurality of devices is configured to synchronize its bit-timing counter to an observed falling edge of a bus signal on the bus.

18. The system of claim 1, wherein the plurality of devices comprise point-of-load (POL) regulators.

19. The system of claim 1, wherein each of the plurality of devices is configured to drive the bus with open-drain outputs.

20. The system of claim 1, wherein the bus is pulled high when none of the plurality of devices are driving the bus low.

21. A point-of-load (POL) regulator comprising:
a bus controller configured to transmit and receive packets to and from a bus, wherein in transmitting and receiving the packets the bus controller is configured to transmit logic data values over the bus through pulse-width modulated (PWM) encoding, wherein the bus controller is configured to:
initiate a bus transaction by transmitting a packet onto the bus, wherein a leading byte of the packet comprises an address uniquely identifying the POL regulator, wherein the address uniquely identifying the POL regulator is also indicative of a priority assigned to the POL regulator when the POL regulator is attempting to transmit data packets onto the bus;
monitor the bus as the leading byte of the packet is transmitted;
recognize loss of arbitration when, during transmission of the leading byte of the packet, a data value on the bus does not match a value the bus controller is attempting to transmit; and
suspend transmission of the packet upon recognizing loss of arbitration.

22. The POL regulator of claim 21, further comprising a circuit coupled to the bus controller, and configured to provide a regulated output voltage according to information contained in packets received by the bus controller.

23. The POL regulator of claim 21, wherein in transmitting a packet onto the bus, the bus controller is configured to:
drive the bus when attempting to transmit a first logic value; and
not drive the bus when attempting to transmit a second logic value.

24. The POL regulator of claim 21, wherein the bus controller comprises a fair bit, wherein the bus controller is configured to suspend transmitting packets when the fair bit is cleared.

25. A bus controller configured to:
transmit and receive packets to and from a bus, wherein in transmitting and receiving the data packets, the bus controller is configured to transmit logic data values over the bus through pulse-width modulated (PWM) encoding;
initiate bus transactions by transmitting packets onto the bus, wherein a leading byte of a leading packet of each initiated bus transaction comprises an address uniquely identifying a device that comprises the bus controller, wherein the address uniquely identifying the device is also indicative of a priority assigned to the device when the device is attempting to transmit data packets onto the bus;
monitor the bus as the leading byte of the leading packet is transmitted; and
suspend transmission of the leading packet when, during transmission of the leading byte of the leading packet, a monitored data value on the bus does not match a data value the bus controller is attempting to transmit.

26. The bus controller of claim 25, comprising dedicated hardware registers to support a complete definition of a transmit packet and complete reception of a packet.

27. A method for transmitting and receiving packets to and from a bus, the method comprising:
a first device initiating bus transactions on the bus, comprising transmitting a leading packet that comprises a leading byte, wherein transmitting the leading packet comprises transmitting logic data values over the bus through pulse-width modulated (PWM) encoding, wherein the leading byte comprises an address uniquely identifying the first device, wherein the address uniquely identifying the first device is also indicative of a priority assigned to the first device when the first device is attempting to transmit data packets onto the bus;
the first device monitoring the bus during said transmitting the leading byte of the leading packet; and
the first device suspending said transmitting the leading packet when said monitoring indicates that a bit value on the bus does not match a bit value the first device is attempting to transmit during said transmitting the leading byte of the leading packet.

28. A method for transmitting and receiving packets to and from a bus, the method comprising:
each respective device of a plurality of devices transmitting respective one or more packets onto the bus, wherein transmitting the respective one or more packets comprises transmitting logic data values over the bus through pulse-width modulated (PWM) encoding, wherein of the respective one or more packets comprises a respective leading packet that comprises a respective leading byte, wherein the respective leading byte comprises an address uniquely identifying the respective device, wherein the address uniquely identifying the respective device is also indicative of a priority assigned to the respective device when the respective device is attempting to transmit data packets onto the bus;
each respective device monitoring the bus during said transmitting the respective leading byte of its respective leading packet; and
each respective device suspending transmitting its respective leading packet when said monitoring indicates that a bit value on the bus does not match a bit value the respective device is attempting to transmit during said transmitting the respective leading byte of its respective leading packet.

29. The method of claim 28, further comprising:
grouping the respective one or more packets transmitted by the plurality of devices into one or more burst transmissions; and
separating each packet within a burst transmission of the one or more burst transmissions from a next packet within the burst transmission of the one or more burst transmissions by transmitting at least two stop bits as the last two bits of each packet.

30. The method of claim 29, further comprising separating one burst transmission of the one or more burst transmissions from another burst transmission of the one or more burst transmissions by transmitting at least three stop bits as the last three bits of a final packet of a burst transmission.

31. The method of claim 29, further comprising:
prior to transmitting packets in a burst transmission, setting a flag in each respective device to allow the respective device to transmit a packet; and
resetting the flag once the respective device has successfully transmitted a packet, to prevent the respective device from transmitting additional packets during the burst transmission.

32. The method of claim 31, further comprising setting the flag in each respective device once the burst transmission has ended, to re-enable the respective device to transmit packets.

* * * * *